United States Patent
Tanaka et al.

(10) Patent No.: US 6,824,935 B2
(45) Date of Patent: Nov. 30, 2004

(54) SUBSTRATE HAVING COLORED LAYERS AND METHOD FOR PRODUCING THE SAME

(75) Inventors: Mitsuhiro Tanaka, Nara (JP); Yoshihide Koyama, Nara (JP); Kazuya Yoshimura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 97 days.

(21) Appl. No.: 10/246,461

(22) Filed: Sep. 19, 2002

(65) Prior Publication Data

US 2003/0138574 A1 Jul. 24, 2003

(30) Foreign Application Priority Data

Sep. 25, 2001 (JP) .......................................... 2001-292236
Mar. 14, 2002 (JP) .......................................... 2002-070629

(51) Int. Cl.[7] .......................... G02F 1/1335; G02B 5/20; G09F 9/35

(52) U.S. Cl. ............................. 430/7; 349/106; 349/113

(58) Field of Search ............................. 430/7; 349/106, 349/113

(56) References Cited

U.S. PATENT DOCUMENTS 6,501,521 B2 * 12/2002 Matsushita et al. ......... 349/106
6,542,209 B2 * 4/2003 Kim et al. .................. 349/106
2002/0196392 A1 * 12/2002 Kawano et al. ............. 349/104

FOREIGN PATENT DOCUMENTS

| CN | 1305120 A |   | 8/2000 |
| JP | 63-210901 A |   | 9/1988 |
| JP | 8-286178 A |   | 11/1996 |
| JP | 10-123312 A | * | 5/1998 |
| JP | 11-183892 A |   | 7/1999 |

OTHER PUBLICATIONS

Chinese Office Action mailed Apr. 2, 2004 (w/partial English translation).
U.S. application Ser. No. 10/092,421, filed Mar. 7, 2002.

* cited by examiner

Primary Examiner—John A. McPherson
(74) Attorney, Agent, or Firm—Nixon & Vanderhye P.C.

(57) ABSTRACT

The substrate having colored layers of the present invention includes: a substrate; a reflection layer formed on the substrate; and colored layers of different colors formed on the reflection layer and including a plurality of pixel regions, wherein each of the plurality of pixel regions includes a plurality of colorless regions that are substantially colorless.

22 Claims, 21 Drawing Sheets

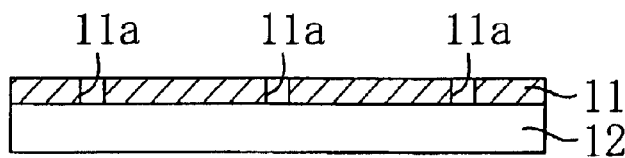
FIG. 5A
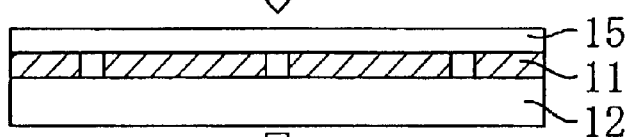
FIG. 5B
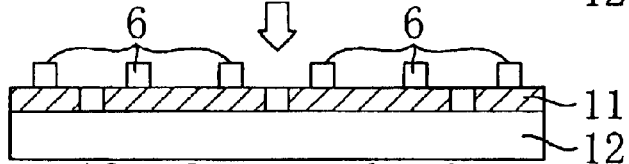
FIG. 5C
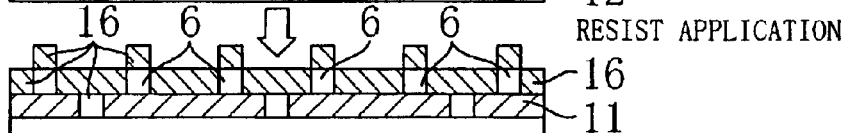
FIG. 5D — RESIST APPLICATION
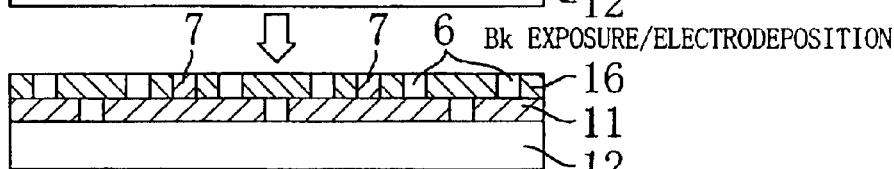
FIG. 5E — Bk EXPOSURE/ELECTRODEPOSITION
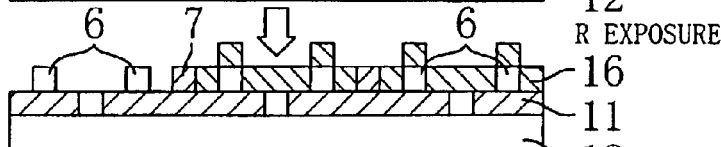
FIG. 5F — R EXPOSURE
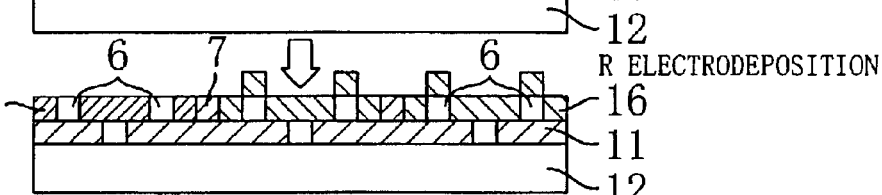
FIG. 5G — R ELECTRODEPOSITION
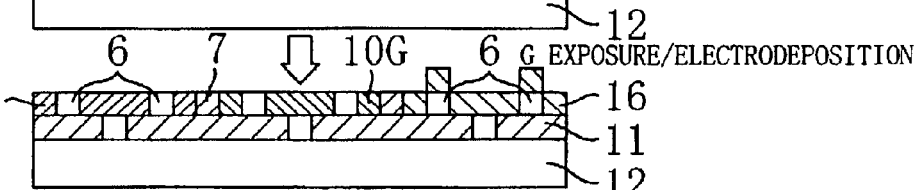
FIG. 5H — G EXPOSURE/ELECTRODEPOSITION
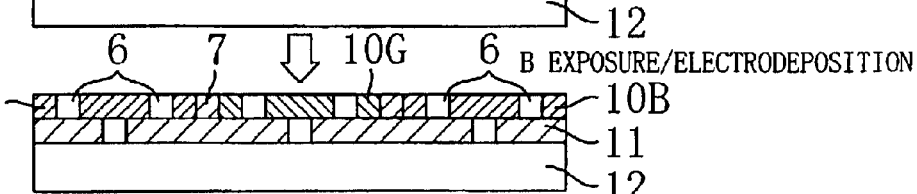
FIG. 5I — B EXPOSURE/ELECTRODEPOSITION
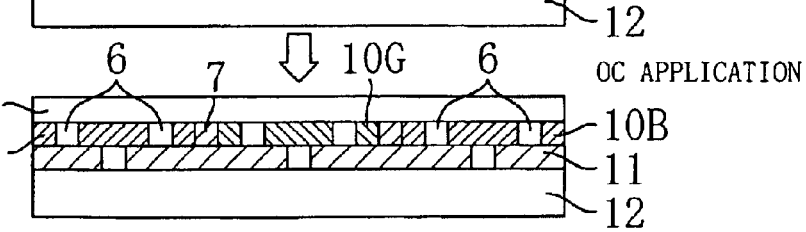
FIG. 5J — OC APPLICATION

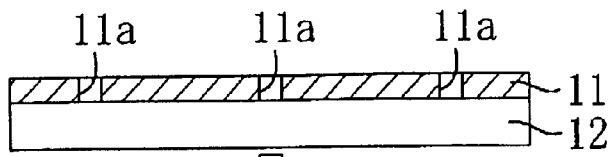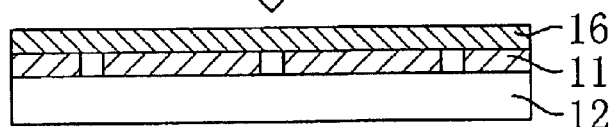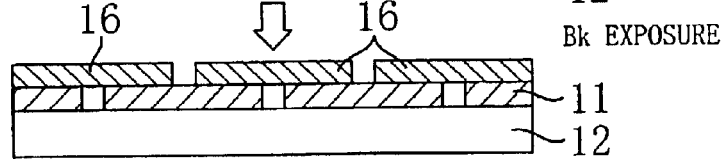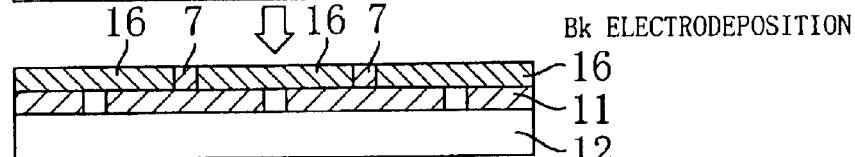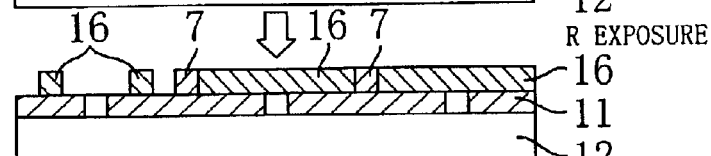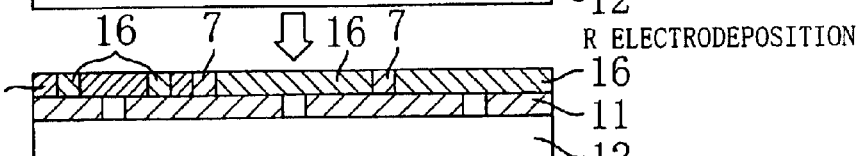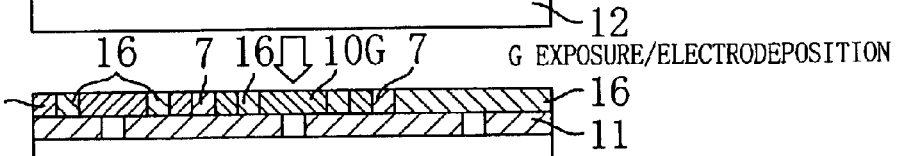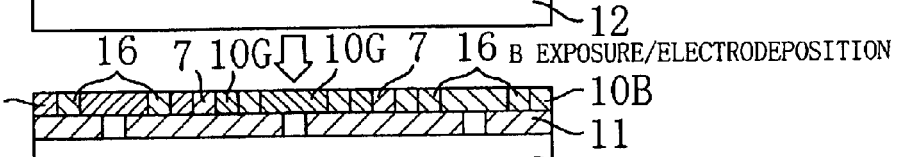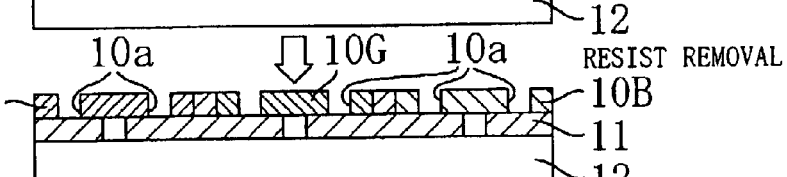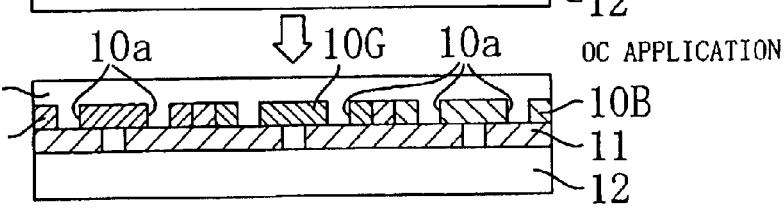

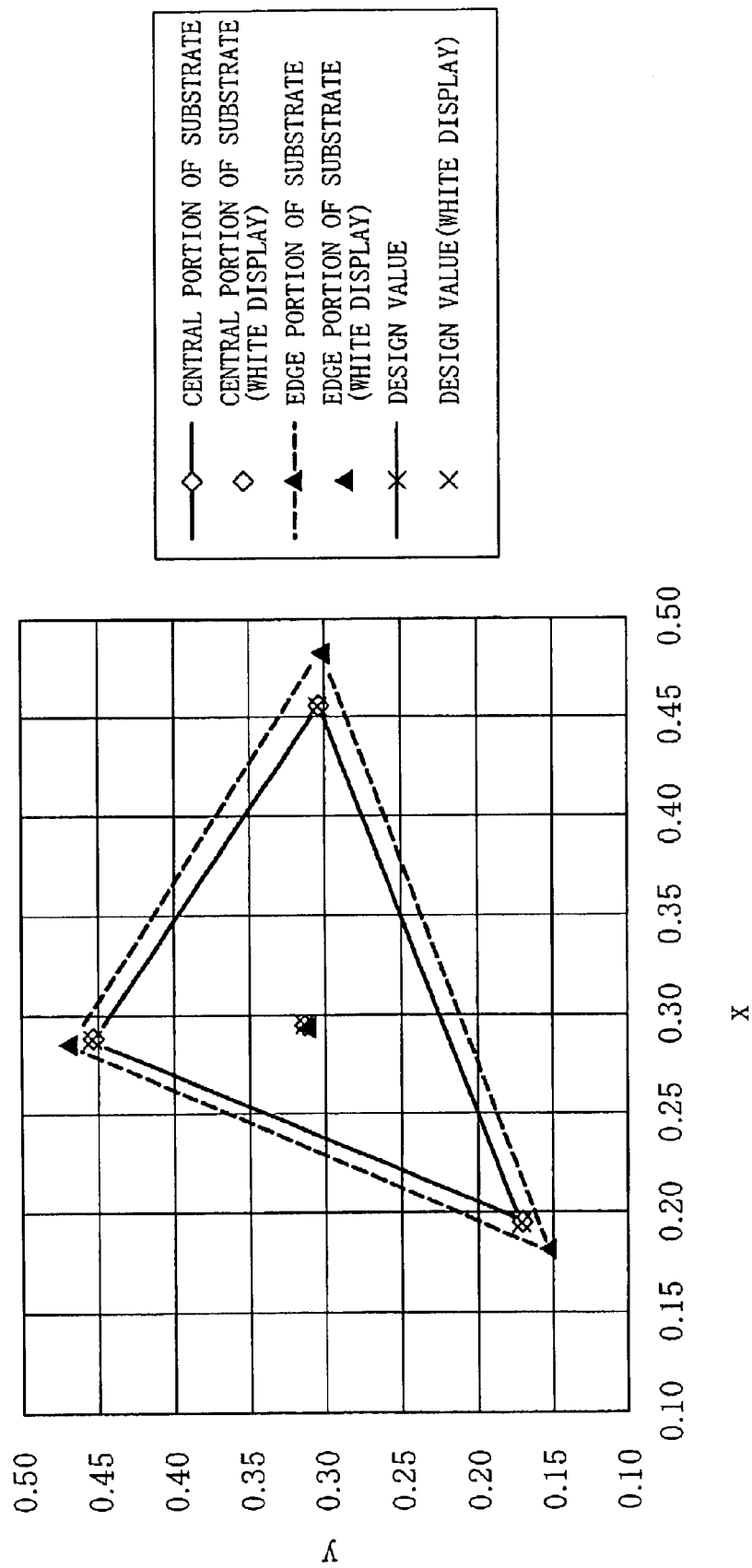

FIG. 25A

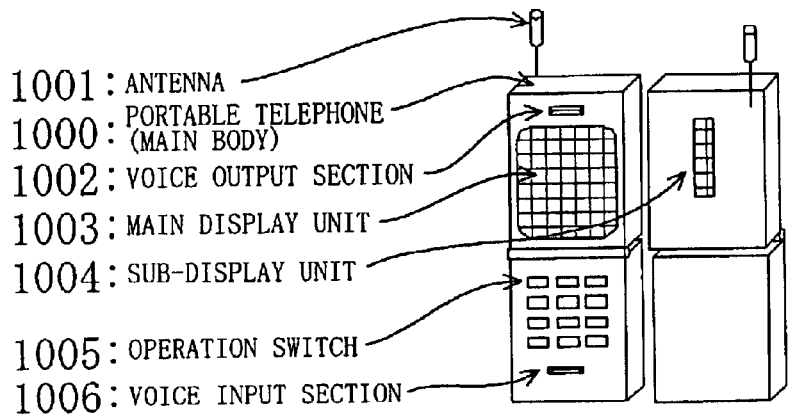

1001: ANTENNA
1000: PORTABLE TELEPHONE (MAIN BODY)
1002: VOICE OUTPUT SECTION
1003: MAIN DISPLAY UNIT
1004: SUB-DISPLAY UNIT
1005: OPERATION SWITCH
1006: VOICE INPUT SECTION

FIG. 25B

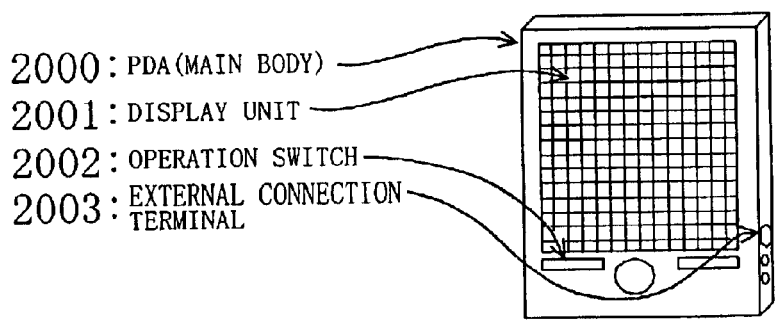

2000: PDA (MAIN BODY)
2001: DISPLAY UNIT
2002: OPERATION SWITCH
2003: EXTERNAL CONNECTION TERMINAL

FIG. 25C

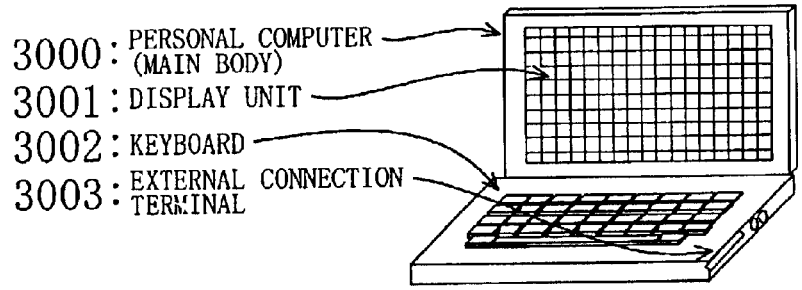

3000: PERSONAL COMPUTER (MAIN BODY)
3001: DISPLAY UNIT
3002: KEYBOARD
3003: EXTERNAL CONNECTION TERMINAL

FIG. 25D

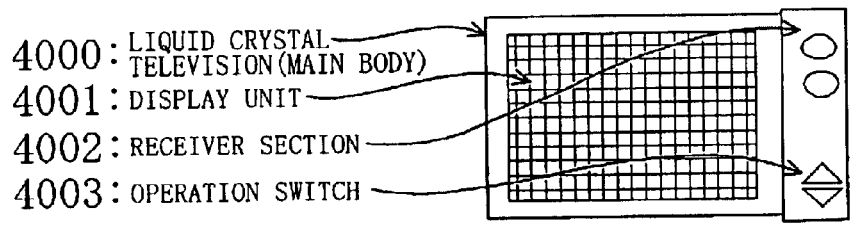

4000: LIQUID CRYSTAL TELEVISION (MAIN BODY)
4001: DISPLAY UNIT
4002: RECEIVER SECTION
4003: OPERATION SWITCH

FIG. 25E

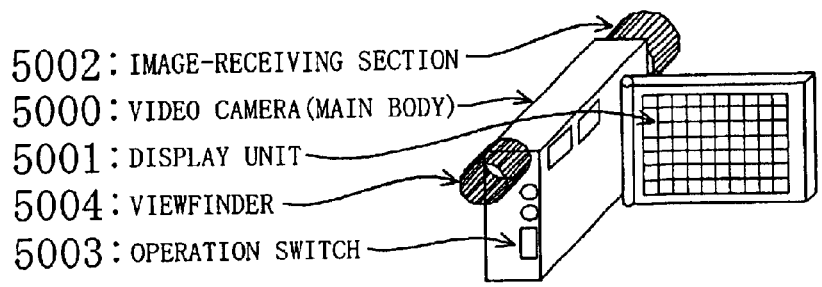

5002: IMAGE-RECEIVING SECTION
5000: VIDEO CAMERA (MAIN BODY)
5001: DISPLAY UNIT
5004: VIEWFINDER
5003: OPERATION SWITCH

SUBSTRATE HAVING COLORED LAYERS AND METHOD FOR PRODUCING THE SAME

BACKGROUND OF THE INVENTION

1. Field of the Invention

The present invention relates to a substrate having colored layers of different colors formed thereon, including colorless regions that are substantially colorless, and a method for producing the same. The substrate having colored layers of the present invention may be used in a reflective color liquid crystal display device that operates in a reflection display mode by reflecting incident light from the environment (hereinafter referred to also as "ambient light"), or in a transflective (hereinafter referred to also as "semi-transmissive") color liquid crystal display device that operates in a reflection display mode under bright environments while operating in a transmission display mode by transmitting light from the backlight under dark environments.

2. Description of the Background Art

A semi-transmissive color liquid crystal display device is widely used as a display of a portable device, etc., as it is capable of operating in a reflection display mode using ambient light under bright environments, thereby reducing the power consumption, while operating in a transmission display mode using the backlight under dark environments, thereby making it possible to use the device under any environment.

A conventional semi-transmissive color liquid crystal display device is a two-way display type liquid crystal display device as disclosed in Japanese Laid-Open Patent Publication No. 11-183892. The publication discloses a liquid crystal display device in which openings are provided in red, green and blue color filters (hereinafter referred to also as "CFs") provided on the inner surface of a front-side substrate so that each opening partially corresponds to a pixel region, with a reflection film being provided on the inner surface of a back-side substrate so as to correspond to the opening. When the liquid crystal display device operates in a reflection display mode, colored light, which has been transmitted through a portion of a CF other than the opening and reflected by a semi-transmissive reflector, and non-colored light of a high brightness, which has been transmitted through the opening of the CF and reflected by the reflection film, can be output in front of the device, thereby displaying a color image with a high brightness. When the liquid crystal display device operates in a transmission display mode, only colored light, which has been transmitted through the portion of the CF other than the opening, can be output in front of the device, thereby displaying a color image with a high contrast. Note that the publication discloses a pigment dispersion method as a CF formation method (see Paragraph [0040] of the publication).

Japanese Laid-Open Patent Publication No. 8-286178 discloses a reflective or transmissive liquid crystal display device in which a CF including a light-transmitting opening therein is provided for each pixel, and states that it is possible to realize a bright display with the device. The publication also describes the provision of a highly-transmissive CF in a region corresponding to the opening in the CF, and describes methods for forming the highly-transmissive CF, such as a photobleaching reaction of an organic pigment and a partial dying method (see Paragraphs [0103] to [0107] and FIG. 8 of the publication).

Beside the pigment dispersion method, etc., described in the publications above, another CF formation method is a resist direct electrodeposition method as disclosed in, for example, Japanese Laid-Open Patent Publication No. 63-210901. A resist direct electrodeposition method, with which the process can be simplified and which is low in cost, is advantageous over other methods. A process of forming a CF by using a resist direct electrodeposition method will be described with reference to FIG. 24A to FIG. 24J. First, a transparent conductive layer 82 and a positive-type photosensitive resin composition layer 83 are formed in this order on a substrate 81 (FIG. 24A). After a positive-type mask 84 having a predetermined pattern is placed on the photosensitive resin composition layer 83, the structure is exposed, and a portion of the photosensitive resin composition layer 83 in the exposed region thereof is eluted by using an eluent (FIG. 24B). An electric current is passed through the transparent conductive layer 82 in an electrodeposition bath containing an electrodepositing polymer and a dye so as to electrodeposite R (red), for example (FIG. 24C). Other hues, i.e., G (green) and B (blue), are electrodeposited in a manner as that for R (red), thereby forming the photosensitive resin composition layer 83 including colored portions therein (FIG. 24D to FIG. 24G). Then, the entire photosensitive resin composition layer 83 is exposed, and the remaining photosensitive resin composition is eluted in an eluent, thereby leaving the R (red), G (green) and B (blue) color filters on the transparent conductive layer 82. In a case where a CF with no opening (colorless region), as described in Japanese Laid-Open Patent Publication No. 63-210901, is formed, a high patterning precision is not required because it is only necessary to form a CF in each pixel. Note that in an opening in a CF, reflected light is not colored and is substantially colorless. The opening portion of the CF will be referred to also as "colorless region".

However, in a case where a CF with an opening therein is formed, a poor patterning precision may result in variations in the area of the opening, leading to variations in the display chromaticity. Therefore, the formation of a CF having an opening therein is stringent as to the patterning precision, making the process control difficult.

With the resist direct electrodeposition method shown in Japanese Laid-Open Patent Publication No. 63-210901, the R, G and B CFs are successively formed by using the same photosensitive resin composition layer 83. Therefore, the sensitivity of the photosensitive resin composition layer 83 gradually decreases, thereby decreasing the CF dimensional precision. Thus, in a case where an opening is formed in a CF by using the resist direct electrodeposition method, the precision in the position or area of the opening decreases along with the decrease in the CF dimensional precision.

In a case where the liquid crystal display device described in Japanese Laid-Open Patent Publication No. 11-183892 is formed by using the resist direct electrodeposition method, variations in the dimension of the CF cause variations in the area of the opening of the CF and, in turn, variations in the display chromaticity.

Japanese Laid-Open Patent Publication No. 8-286178 describes the provision of a highly-transmissive CF in a region corresponding to an opening by using a photobleaching reaction and a partial dying method. Also with these methods, it is necessary to perform a patterning process such as an exposure and development process, thereby causing variations in the area of the opening and, in turn, variations in the display chromaticity. Moreover, a method using the photobleaching reaction has a problem as to the reliability of the obtained CF, i.e., the CF is decolorized in a long-term use. With the partial dying method, a partial dying process needs to be performed for each color, thereby increasing the number of steps.

Moreover, in a case where a CF is formed on a synthetic resin substrate, such a substrate is subject to thermal expansion, which not only changes the dimension but also makes alignment difficult, thereby causing more serious variations in the chromaticity.

An object of the present invention is to provide a reflective or semi-transmissive color liquid crystal display device with a good visibility in which variations in the display chromaticity are reduced. Another object of the present invention is to provide a substrate having colored layers for use in such a liquid crystal display device, and a method for producing the same.

SUMMARY OF THE INVENTION

A substrate having colored layers of the present invention includes: a substrate; a reflection layer formed on the substrate; and colored layers of different colors formed on the reflection layer and including a plurality of pixel regions, wherein each of the plurality of pixel regions includes a plurality of colorless regions that are substantially colorless. In the substrate having colored layers of the present invention, a plurality of colorless regions are formed in each pixel, whereby in a reflection display mode, non-colored reflected light is combined with colored reflected light while being dispersed across each pixel. Therefore, bright regions are dispersed across each pixel, thereby reducing the variations in the display chromaticity in each pixel and thus improving the visibility.

Herein, "substantially colorless" is used to mean not only a hue such that the coloring of the light cannot be visually determined, but also a hue such that the slight coloring of the light for tint adjustment can be visually determined.

It is preferred that a total area of the plurality of colorless regions included in each of the plurality of pixel regions is the same among the colored layers of the same hue. With the substrate having colored layers, the variations in the brightness of non-colored reflected light are reduced among pixels of the same hue, thereby reducing the variations in the display chromaticity among pixels of the same hue and thus improving the visibility.

It is preferred that: a colorless layer that is substantially colorless is formed in each of the colorless regions of the colored layers of different colors; and the colored layers of different colors are formed after the formation of the colorless layers. For example, the colorless layers may be formed by forming a colorless resin film that is substantially colorless and then removing a portion of the colorless resin film in each region other than the colorless regions, and the colored layers of different colors may be formed, one hue after another, in regions other than the regions where the colorless layers have been formed. In the substrate having colored layers, the colored layers of different hues are formed after the size (area) of the colorless region has been determined by the colorless layers, whereby it is possible to obtain a substrate having colored layers including colorless regions of a uniform size (area) independently of the colored layer formation margin.

It is preferred that a flattening film for flattening the colorless layers and the colored layers is formed on the colorless layers and the colored layers, with a refractive index of the colorless layers being substantially the same as that of the flattening film. In the substrate having colored layers, the refractive index of the colorless layer is substantially the same as that of the flattening film, thereby reducing reflection at the interface between the colorless layer and the flattening film and thus improving the optical characteristics.

It is preferred that the colored layers of different colors are red, blue and green colored layers, and as a chromaticity in a reflection mode is measured for each of the hues of the colored layers at a plurality of positions on the substrate, an average value of Y values that are taken for each hue is substantially the same among the plurality of positions on the substrate. In the substrate having colored layers, the average value of Y values that are taken for each hue is substantially the same among different positions on the substrate, whereby a white display by reflected light is uniform across the entire substrate, and thus it is possible to realize a white display as designed.

Each of the plurality of pixel regions may include a transmission region in which light is transmitted and a reflection region in which light is reflected by the reflection layer, with the plurality of colorless regions being included in the reflection region. With the substrate having colored layers, it is possible to obtain a bright display as non-colored reflected light and colored reflected light are combined together under bright environments, whereas it is possible to display a color image by transmitting light from the backlight under dark environments.

The substrate may be a resin substrate.

A production method of the present invention is a method for producing a substrate having colored layers, including a substrate and colored layers of different colors formed on the substrate, the colored layers including a plurality of colorless regions that are substantially colorless, the method including the steps of: forming colorless layers that are substantially colorless on the substrate; and forming the colored layers of different colors, one hue after another, in a region other than the colorless regions in which the colorless layers have been formed. In the production method of the present invention, the colorless layers are formed before the formation of the colored layers, whereby it is possible to reduce the positional shift of the colorless layers as the colorless layers can be formed independently of the precision with which the colored layers are formed. Therefore, it is possible to obtain a substrate having colored layers with reduced variations in the display chromaticity for the same hue among different pixels.

The method for producing a substrate having colored layers of the present invention may include the steps of: forming a resist film on the substrate; exposing and developing the resist film so as to remove a portion of the resist film in each of the colorless regions, and then forming the colorless layers in the colorless regions; and after the formation of the colorless layers, exposing and developing the resist film so as to remove a portion of the resist film in each region where the colored layer is to be formed, and then forming the colored layer. With the production method, it is possible to remove a portion of the resist film in each colorless region through the first exposure and development process, in which the resist sensitivity is highest, whereby it is possible to form a colorless layer in each colorless region with a high precision. Moreover, the resist film used for the formation of the colorless layers can be used also for the formation of the colored layers, thereby simplifying the production process.

In the method for producing a substrate having colored layers of the present invention, it is preferred that the colorless layer is made of the same type of material as a material of the colored layer excluding a pigment. With the production method, it is possible to form the colorless layers by using the same method as that for forming the colored layers, thereby simplifying the production process. Note that "material of the same type" refers to a material that is the same as the material of the colored layer excluding the pigment, and the colorless layers are made of a colorless and transparent resin that contains no pigment at all, or a substantially colorless and transparent resin that contains a slight amount of pigment for tint adjustment.

The method for producing a substrate having colored layers of the present invention may include the steps of: forming a photosensitive resin film that is substantially colorless on the substrate; removing a portion of the resin film in a region other than the colorless regions, and forming the colorless layers in the colorless regions; forming the colored layers of different colors, one hue after another, in a region other than the regions in which the colorless layers have been formed. With the production method, it is possible to form the colorless layers in the colorless regions by exposing, developing and sintering the photosensitive resin film. Therefore, it is not necessary to form a resist film on the resin film for the formation of the colorless layers, thereby simplifying the production process.

The method for producing a substrate having colored layers of the present invention may include the steps of: after the formation of the colorless layers, forming a resist film on the substrate; exposing and developing the resist film so as to remove a portion of the resist film in a region where the colored layer of one of the different colors is to be formed, and then forming the colored layer of the one of the different colors; and after the formation of the colored layer of the one of the different colors, exposing and developing the resist film so as to remove a portion of the resist film in a region where the colored layer of another one of the different colors is to be formed, and forming the colored layer of the other one of the different colors. With the production method, it is possible to reduce the positional shift of the colorless layers even in a case where the colored layers are formed by using a successive exposure/development type photoresist, which can be used repeatedly. Therefore, it is possible to obtain a substrate having colored layers with reduced variations in the display chromaticity for the same hue among different pixels.

In the method for producing a substrate having colored layers of the present invention, the colorless layers and/or the colored layers may be formed by electrodeposition. With the production method, even in a case where the colorless layers or the colored layers are formed by using an electrodeposition method such as a resist direct electrodeposition method, variations in the position or area of the colorless regions are unlikely to occur, and thus the variations in the display chromaticity can be reduced.

In the method for producing a substrate having colored layers of the present invention, the substrate may be a resin substrate. With the production method of the present invention, even in a case where a resin (plastic) substrate, which has the problem of thermal expansion, is used, variations in the position or area of the colorless regions are unlikely to occur, and thus the variations in the display chromaticity can be reduced.

A liquid crystal display device of the present invention includes the substrate having colored layers of the present invention. With the liquid crystal display device of the present invention, it is possible to realize a uniform display across the substrate surface with reduced variations in the display chromaticity.

Another liquid crystal display device of the present invention is a liquid crystal display device including a substrate having colored layers that is produced by a method for producing a substrate having colored layers, in which the colorless layers and/or the colored layers are formed by electrodeposition, or by a method for producing a substrate having colored layers, in which the substrate is a resin substrate, wherein it is preferred that a reflection layer is formed on the substrate, the reflection layer including an opening portion that transmits light therethrough and a reflection portion that reflects light, with each of the colorless regions being formed above the reflection portion. The liquid crystal display device is a semi-transmissive color liquid crystal display device, and the substrate having colored layers used therein is such that the colorless regions are formed in the colored layer with a high precision, and each colorless region of the colored layer is formed above the reflection portion of the reflection layer without a positional shift. Therefore, it is possible to realize a uniform display across the substrate surface with reduced variations in the display chromaticity.

The liquid crystal display device of the present invention has a very wide variety of applications, and can be used in an electronic device of any field. The liquid crystal display device of the present invention is capable of displaying a color image with a high quality both in a reflection mode and in a transmission mode, and it is thus highly suitable for portable electronic devices that are used under considerably different environments and that are required to have a low power consumption, e.g., portable electronic devices that are used while being moved between an outdoor environment and an indoor environment. Moreover, other applications include a bulletin board system, a facsimile machine, and a display of a home electronics terminal.

BRIEF DESCRIPTION OF THE DRAWINGS

FIG 5A–FIG. 5J are schematic cross-sectional views illustrating a method for producing a substrate having colored layers used in the liquid crystal display device of Embodiment 1.

FIG. 8A–FIG. 8J are schematic cross-sectional views illustrating a method for producing a substrate having colored layers used in the liquid crystal display device of Embodiment 2.

FIG. 19 is a chromaticity diagram in a case where an alignment shift of 10 μm has occurred, as illustrated in FIG. 17B

FIG. 25A to FIG. 25E are diagrams each illustrating an example of an electronic device in which the liquid crystal display device of the present invention can be used.

DETAILED DESCRIPTION OF THE PREFERRED EMBODIMENTS

Embodiments of the present invention will now be described with reference to the drawings. Although a semi-transmissive liquid crystal display device will be described as an example of a liquid crystal display device in the embodiments below, the present invention can also be applied to a reflective liquid crystal display device. Moreover, although a passive matrix STN liquid crystal display device will be described as an example below, the present invention can also be applied to an active matrix liquid crystal display device using a switching element such as a TFT (Thin Film Transistor) or an MIM (Metal-Insulator-Metal). Furthermore, the application of the substrate having colored layers of the present invention is not limited to a liquid crystal display device, but may alternatively be any of various other reflective display devices that display an image by reflecting the ambient light.

EMBODIMENT 1

Figure 1:
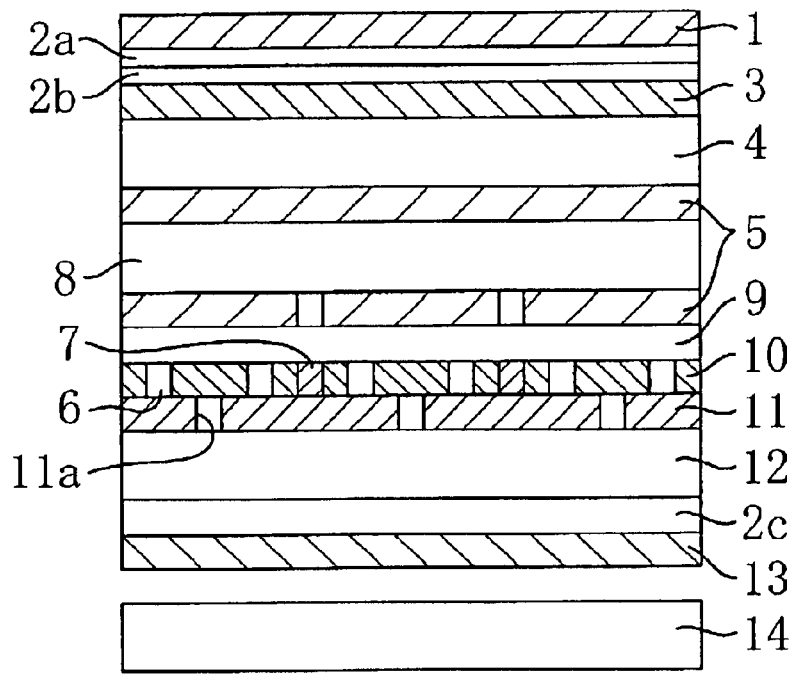
FIG. 1 is a cross-sectional view schematically illustrating a semi-transmissive color liquid crystal display device of Embodiment 1.

FIG. 1 is a cross-sectional view schematically illustrating a semi-transmissive color liquid crystal display device of Embodiment 1. The liquid crystal display device includes an upper polarizer 1, a first phase plate 2a, a second phase plate 2b, a forward diffusion plate 3, an upper substrate 4 made of glass, a transparent display electrode (also referred to simply as "transparent electrode") 5, an alignment film (not shown), a liquid crystal layer 8, an alignment film (not shown), a transparent electrode 5, an overcoat film 9, a colored layer 10, a reflection layer 11, a lower substrate 12 made of glass, a third phase plate 2c, a lower polarizer 13, and a backlight 14, arranged in this order from the viewer side (the upper side in FIG. 1).

In the present specification, the minimum unit of display will be referred to as a "picture element", and each "picture element" includes a plurality of "pixels", i.e., red (R), green (G) and blue (B) pixels. A region of the liquid crystal display device corresponding to each "pixel" (hereinafter referred to as a "pixel region") is defined by transparent electrodes interposing a liquid crystal layer therebetween. For example, in a passive matrix liquid crystal display device, a pixel region is defined as a region where one of column electrodes which are arranged in a stripe pattern crosses one of row electrodes which are also arranged in a stripe pattern perpendicular to the column electrodes. In an active matrix type liquid crystal display device, a pixel region is defined by a pixel electrode and a counter electrode which opposes the pixel electrode. In an arrangement with a black matrix, strictly speaking, a pixel region is a portion of each region across which a voltage is applied according to the intended display state which corresponds to an opening of the black matrix.

Figure 2:
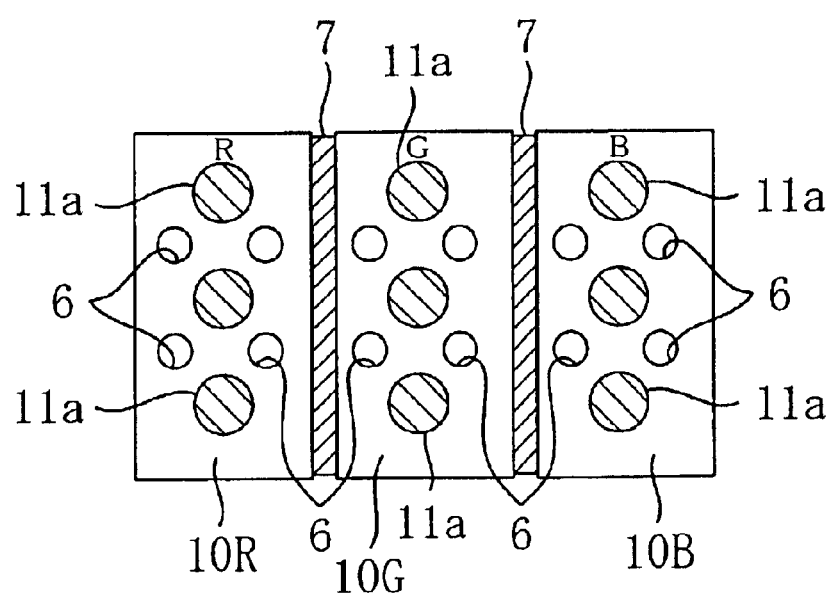
FIG. 2 is a plan view schematically illustrating one picture element in the liquid crystal display device of Embodiment 1.

FIG. 2 is a plan view schematically illustrating one picture element of the liquid crystal display device of Embodiment 1. In the present embodiment, each picture element includes three pixels of different hues of R, G and B. Each of the R, G and B colored layers 10R, 10G and 10B includes, in the pixel region thereon, a plurality of colorless regions that are substantially colorless. In the present embodiment, each of the R, G and B colored layers 10R, 10G and 10B includes four circular colorless regions. A colorless layer 6 that is substantially colorless is formed in each colorless region.

In the present embodiment, the R, G and B pixel regions have an equal total area of colorless regions included in one pixel region. Alternatively, the total area of colorless regions of each of the hues, R, G and B, may be adjusted differently for tint adjustment. For example, if a plastic substrate gets yellowish through a production process, the proportion of the reflection region of the colored layer 10B of blue (B), which is approximately the complementary color to yellow, can be increased, and the size (area) of the colorless region in the colored layer 10B of blue (B) may be decreased relative to those in the colored layers 10R and 10G of red (R) and green (G), so that a white display in a reflection display mode can be approximately white light.

In the liquid crystal display device of the present embodiment, the reflection layer 11 includes an opening 11a for transmitting light from the backlight 14 therethrough. A portion of each pixel region where the reflection layer 11 is formed is a reflection region, whereas a portion corresponding to the opening 11a of the reflection layer 11 is a transmission region. In each pixel region, the opening 11a is located so as not to overlap with the colorless region where the colorless layer 6 is formed. Thus, the colorless region where the colorless layer 6 is formed is included in the reflection region (in other words, the colorless layer 6 is formed in the reflection region). The total area of the openings 11a in each pixel is preferably 25% to 80% of the area of the pixel region, and is set to be 30%, for example. If it is less than 25%, transmitted light is not sufficiently utilized, thereby resulting in a dark display in a transmission display mode. If it is greater than 80%, the transmission display will be sufficient, but the display in a reflection display mode will be dark, thereby resulting in a poor visibility. The reflection layer 11 is formed by depositing (through a vapor deposition process) aluminum to be 1000 Å (100 nm) thick on the lower substrate 12, and the opening 11a is formed by patterning aluminum by using a photolithography method.

In the present embodiment, the R, G and B pixel regions have an equal size (area) of the openings 11a of the reflection layer 11, i.e., an equal total area of the transmission regions included in one pixel region. Alternatively, the area may be adjusted so as to be suitable for each of the R, G and B colored layers 10R, 10G and 10B in view of the luminosity of each colored layer or the preference in terms of hue. For example, if a plastic substrate gets yellowish through a production process, the size (area) of the opening 11a of the reflection layer 11 in the pixel region of blue (B), which is approximately the complementary color to yellow, can be increased relative to those in the pixel regions of red (R) and green (G), so that a white display in a transmission display mode can be approximately white light.

The overcoat film (flattening film) 9 made of acrylic resin material is formed on the colored layer 10 so as to flatten the surface of the colored layer 10. The transparent electrodes 5 each arranged in a matrix pattern are formed by depositing (through a vapor deposition process) and etching ITO (indium tin oxide) on the upper substrate 4 and on the overcoat film (flattening film) 9 of the lower substrate 12. A black matrix may be formed using a light-absorbing material so as to surround each pixel region, in which case the light blocking effect is improved, thus contributing to an increase in the contrast. A polyimide material is applied by printing on the transparent display electrodes 5, and the polyimide material is sintered so as to form the alignment films. Then, the alignment films are subjected to a rubbing treatment so that the twist angle of the liquid crystal molecules is 240°.

After the upper and lower substrates 4 and 12 are attached to each other via a seal resin, a liquid crystal material whose birefringence Δn and pitch have been adjusted is injected into a gap therebetween, thereby forming an STN liquid crystal cell. Then, the phase plates 2a, 2b and 2c (each of which is a polycarbonate drawn film having a desired value of dΔn, where d is the thickness of the phase plate), the forward diffusion plate 3, and the upper polarizer 1 and the lower polarizer 13 (each of which is neutral gray in color) are attached to the liquid crystal cell so that their optical axes are oriented in predetermined directions with respect to the liquid crystal cell. Furthermore, the backlight 14 is provided on one side of the liquid crystal cell that is away from the viewer so that light from the backlight enters the liquid crystal cell.

Figure 3:
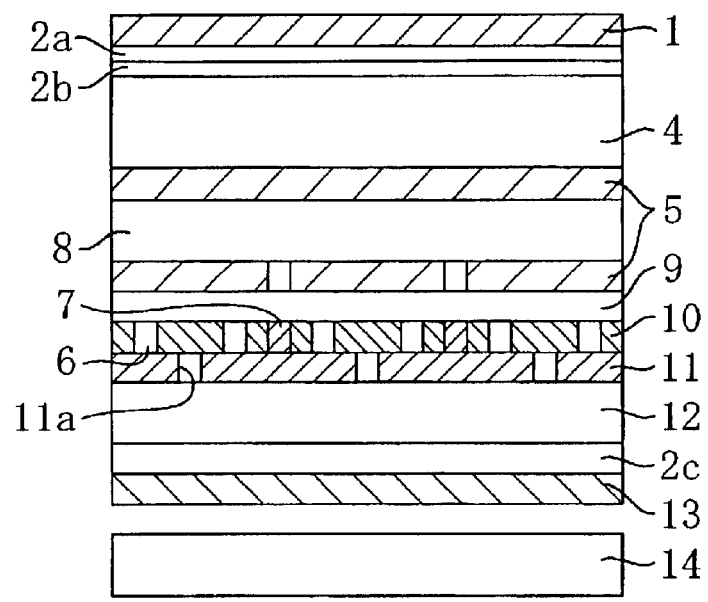
FIG. 3 is a cross-sectional view schematically illustrating a semi-transmissive color liquid crystal display device of an alternative embodiment, in which an overcoat film 9a is provided with a light scattering effect.

Note that although not shown, an acrylic resin may be applied on the lower substrate 12, and a concave/convex pattern may be formed on the surface thereof, after which the reflection layer 11 may be formed thereon so as to provide a light diffusing function, instead of providing the forward diffusion plate 3. Alternatively, the reflection layer 11 may be mirror-finished, with an overcoat film 9a made of transparent resin, in which a light scattering material is dispersed, being separately provided thereon as a light scattering layer, as illustrated in FIG. 3.

Figure 4:
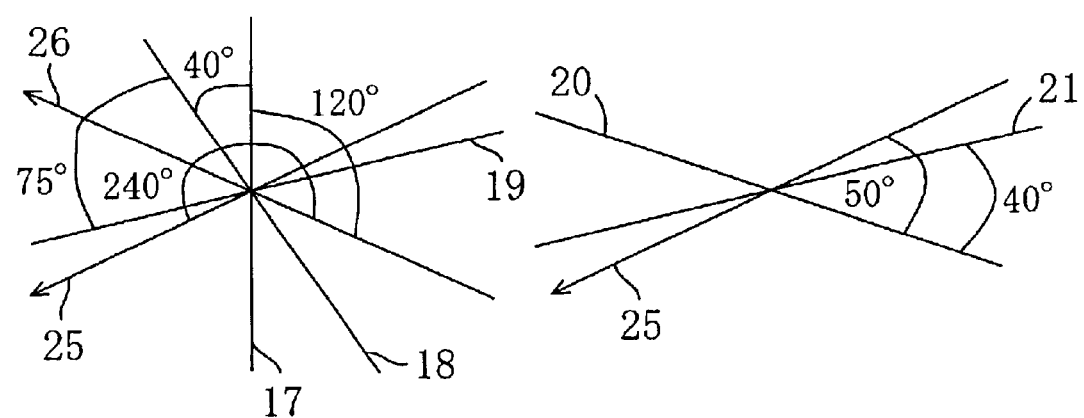
FIG. 4 is a diagram illustrating axial orientations of optical elements with respect to one another in Embodiment 1.

FIG. 4 illustrates axial orientations of the optical elements with respect to one another in Embodiment 1. The twist angle of the liquid crystal molecules in the STN liquid crystal layer 8, i.e., the angle between an orientation direction 25 thereof on the lower substrate 12 and an orientation direction 26 thereof on the upper substrate 4, is 240°. With the clockwise and counterclockwise directions being a positive direction and a negative direction, respectively, the angle of the upper orientation direction 26 of the liquid crystal molecules with respect to a slow axis 17 of the second phase plate 2b is 120°, the angle of the slow axis 17 of the second phase plate 2b with respect to a slow axis 18 of the first phase plate 2a is 40°, and the angle of the slow axis 18 of the first phase plate 2a with respect to an absorption axis 19 of the upper polarizer 1 is 75°. Moreover, the angle of a slow axis 20 of the third phase plate 2c with respect to the orientation direction 25 of the liquid crystal molecules on the lower substrate 12 is 50°, and the angle of an absorption axis 21 of the lower polarizer 13 with respect to the slow axis 20 of the third phase plate 2c is −40°.

The retardation values of the STN liquid crystal layer 8, the first phase plate 2a, the second phase plate 2b and the third phase plate 2c are set to be 800 nm, 680 nm, 180 nm and 140 nm, respectively, and the liquid crystal display device is configured so as to operate in a normally black mode in a reflection mode and in a transmission mode.

In the liquid crystal display device of the present embodiment, the reflection layer 11 including the openings 11a and the colored layer 10 including the colorless layers 6 are arranged so that the openings 11a and the colorless layers 6 are located in different regions in each pixel region. In this way, in a transmission display mode where the light source (backlight 14) provided on the reverse side of the liquid crystal display device is used, light that is transmitted through the opening 11a of the reflection layer 11 passes through the colored layer 10 to the outside, thereby obtaining a bright display with a satisfactory display color saturation. A transmission display of desired characteristics can be obtained by adjusting the luminance of the light source, the area and shape of the opening 11a of the reflection layer 11, and the saturation, transmittance and thickness of the colored layer 10.

In a reflection display mode where ambient light is used, light entering the liquid crystal display device from the front side passes through the colored layer 10 or the colorless layer 6, is reflected by the reflection portions (portions other than the openings 11a) of the reflection layer 11, and passes again through the colored layer 10 or the colorless layer 6 to the outside. Therefore, combined output light of non-colored output light and colored output light is obtained, thus realizing a bright display. In the present embodiment, a plurality of (four) colorless layers 6 are dispersedly arranged in each pixel, whereby in a reflection display mode, non-colored reflected light is combined with colored reflected light while being dispersed across each pixel. Therefore, bright regions are dispersed across each pixel, thereby reducing the variations in the display chromaticity in each pixel and thus improving the visibility. The brightness and saturation of the output light can be adjusted by adjusting, as necessary, the characteristics of the colored layer 10 and the area and shape of the colorless layers 6. By enlarging the colorless layers 6, a color filter (made of a colored layer) having a high color purity can be employed.

Next, the process of producing a substrate having colored layers used in the liquid crystal display device of Embodiment 1 will be described with reference to FIG. 5. First, an ITO film (not shown), on which colored layers are to be electrodeposited, is formed across the entire surface of the glass substrate 12 having the reflection layer 11 including the openings 11a therein (step (a) in FIG. 5). A colorless and transparent resin 15 having a photosensitivity is applied by using a method such as a spin-coating method (step (b) in FIG. 5), and then the colorless layers 6 are formed in colorless regions through an exposure process, a development process and a sintering process (step (c) in FIG. 5).

A successive exposure/development type photoresist 16, which can be used repeatedly, is applied across the entire surface (step (d) in FIG. 5), and a black matrix (Bk) 7, which is a light-blocking film, is formed by a resist direct electrodeposition method (step (e) in FIG. 5). Note that the successive exposure/development type photoresist 16 is a resist that can maintain a photosensitivity through repeated exposure, development, heating processes after its application. An area of the photoresist 16 that is slightly larger than a pixel region that is to be colored in red is exposed and developed so as to remove a portion of the photoresist 16 corresponding to the red pixel region (step (f) in FIG. 5). The red colored layer 10R is formed by using a resist direct electrodeposition method (step (g) in FIG. 5). In the electrodeposition process, the colorless layer 6 is already provided in each colorless region, whereby the colored layer is not formed in these regions. Therefore, it is possible to form the colorless layers 6 in the pixel region of each hue without being influenced by the production precision of the colored layer 10.

Furthermore, the colored layers 10G and 10B of the hues, green (G) and blue (B), are successively electrodeposited in a similar manner, thereby obtaining the colored layers 10R, 10G and 10B of the present embodiment (step (h) and step (i) in FIG. 5). Furthermore, the overcoat film (flattening film) 9 is formed on the colored layers 10R, 10G and 10B and the colorless layers 6 (step (j)) in FIG. 5). Note that the formation of the overcoat film (flattening film) 9 may be omitted. For example, if the colorless layer 6 and the colored layer 10 are formed to have substantially the same thickness, the step between the colorless layer 6 and the colored layer 10 can be eliminated, whereby the formation of the flattening film 9 may be omitted. If the colorless layer 6 and the colored layer 10 are flattened, the step between the colorless layer 6 and the colored layer 10 is reduced, whereby an improvement in the display quality can be expected.

With such a production method, the colorless layers 6 can be formed before the formation of the colored layers 10R, 10G and 10B. Therefore, it is possible to obtain a substrate having colored layers including uniform colorless regions without being influenced by the variations in the position and size of the colorless regions occurring through the production of the colored layer, as those occurring with the conventional production method.

EMBODIMENT 2

Figure 6:
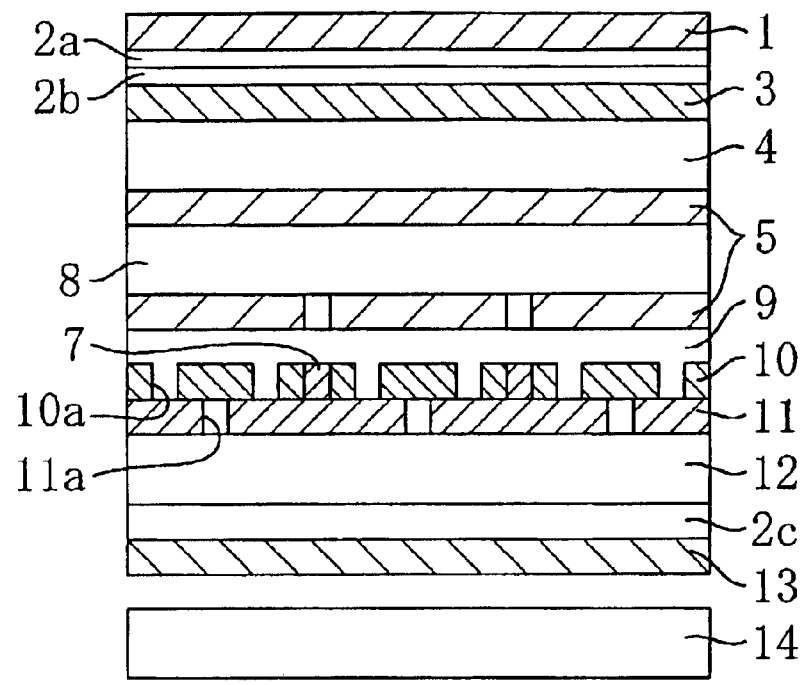
FIG. 6 is a cross-sectional view schematically illustrating a liquid crystal display device of Embodiment 2.
Figure 7:
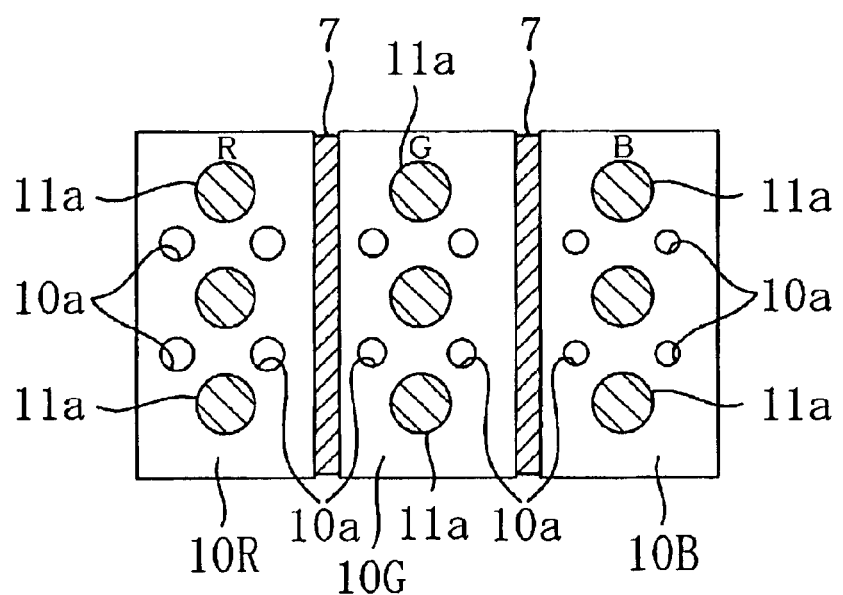
FIG. 7 is a plan view schematically illustrating one picture element in the liquid crystal display device of Embodiment 2.

FIG. 6 and FIG. 7 are diagrams illustrating a liquid crystal display device of Embodiment 2, wherein elements that are substantially the same in function as those of the liquid crystal display device of Embodiment 1 are denoted by the same reference numerals and will not be further described below.

The substrate having colored layers of Embodiment 2 is different from that of Embodiment 1 (where the colorless layer 6 is formed in each colorless region on the reflection layer 11) in that an opening 10a of the colored layer 10 is provided in each colorless region on the reflection layer 11, with the opening 10a being filled with an overcoat.

The process of producing the substrate having colored layers used in the liquid crystal display device of Embodiment 2 will be described with reference to FIG. 8. First, an ITO film, on which colored layers are to be electrodeposited, is formed across the entire surface of the glass substrate 12 having the reflection layer 11 including the openings 11a therein (step (a) in FIG. 8). The successive exposure/ development type photoresist 16, which can be used repeatedly, is applied across the entire surface (step (b) in FIG. 8), after which a portion of the photoresist 16 in each region where the black matrix (Bk) 7 is to be formed is removed by patterning (step (c) in FIG. 8), and the black matrix (Bk) 7, which is a light-blocking film, is formed by a resist direct electrodeposition method (step (d) in FIG. 8).

An area of the photoresist 16 that is slightly larger than a pixel region that is to be colored in red is exposed and developed so as to remove a portion of the photoresist 16 corresponding to the red pixel region except for the colorless regions (step (e) in FIG. 8). The red colored layer 10R is formed by using a resist direct electrodeposition method in each region from which the photoresist 16 has been removed (step (f) in FIG. 8). The colored layers 10G and 10B of the hues, green (G) and blue (B), are successively electrodeposited in a similar manner (step (g) and step (h) in FIG. 8), after which the photoresist 16 remaining in the colorless regions is removed, thereby forming the openings 10a in the colorless regions of the colored layers 10R, 10G and 10B (step (i) in FIG. 8). Furthermore, the overcoat film (flattening film) 9 is formed on the colored layers 10R, 10G and 10B. In this process, the openings 10a of the colored layers 10R, 10G and 10B are filled with the overcoat (step (j) in FIG. 8).

Examination of the size (area) of the colorless region (opening 10a) of the colored layer 10 obtained by this production method has revealed that there are dimensional variations as follows: (1) dimensional variations due to the order in which colored layers are formed on the same substrate; (2) dimensional variations between a central portion and an edge portion of the same substrate; and (3) dimensional variations due to production variations (variations among different lots). Thus, the obtained liquid crystal display device has problems such as variations in the display quality (tint) in a reflection display mode.

The cause for these dimensional variations of the colorless regions (openings 10a) can be explained as follows. In a resist direct electrodeposition method, a pattern is formed by using the same resist a number of times. Therefore, as the sintering step is performed successively for Bk, R, G and B, the sensitivity of the resist decreases and the dimensional precision gradually decreases for R, G and B.

Typically, when the sensitivity of a resist decreases, the resultant structure will have a smaller dimension than the design value with the amount of exposure being equal. Therefore, in order to obtain a colorless region of the designed size, it is necessary to gradually change the conditions, e.g., gradually increase the amount of exposure, and it is necessary to adjust the conditions for each of the colored layers to be formed. Moreover, the amount of adjustment to be made is also a delicate parameter, thus leading to variations among different production lots.

The dimensional precision (patterning precision) of a colored layer with no colorless region is ultimately determined by the light-blocking film or the linear gap between pixels (the gap between adjacent electrodes). Specifically, in a passive matrix arrangement, for example, the linear gap between adjacent stripe electrodes is a region that does not contribute to the display, and the liquid crystal molecules cannot be controlled in such a region. Therefore, a light-blocking film such as a black matrix is provided to cover the region. Since the light-blocking film is usually formed to be larger than the linear gap between pixels, the process precision of the light-blocking film has a significant influence on the aperture ratio. Moreover, in a case where no light-blocking film is provided, the error in the linear gap between stripe electrodes (in other words, the patterning precision of the stripe electrode) has a significant influence on the aperture ratio. Therefore, the process precision of the light-blocking film or the linear gap between pixels has a greater influence on the aperture ratio than the dimensional precision of the colored layer. Thus, the required production precision of the colored layer is not so high.

Moreover, during the sintering step after electrodeposition, heat is applied differently to different regions of each colored layer in the substrate surface, and the decrease in the sensitivity of the resist is greater in regions of greater amounts of heat. Typically, a greater amount of heat is applied to (and thus the sensitivity of the resist decreases more in) an edge portion of the substrate than a central portion of the substrate. Therefore, a colorless region of a colored display that is located farther away from the center of the substrate, i.e., closer to the edge of the substrate, tends to be produced in a smaller dimension than the design value.

Furthermore, with the influence of the dimensional variations (1) in combination with the influence of the dimensional variations (2), the amount of variation of (2) "dimensional variations between a central portion and an edge portion of the same substrate" gradually increases as the colored layer formation process proceeds from the first color (R) to the second color (G), and from the second color (G) to the third color (B).

Figure 9:
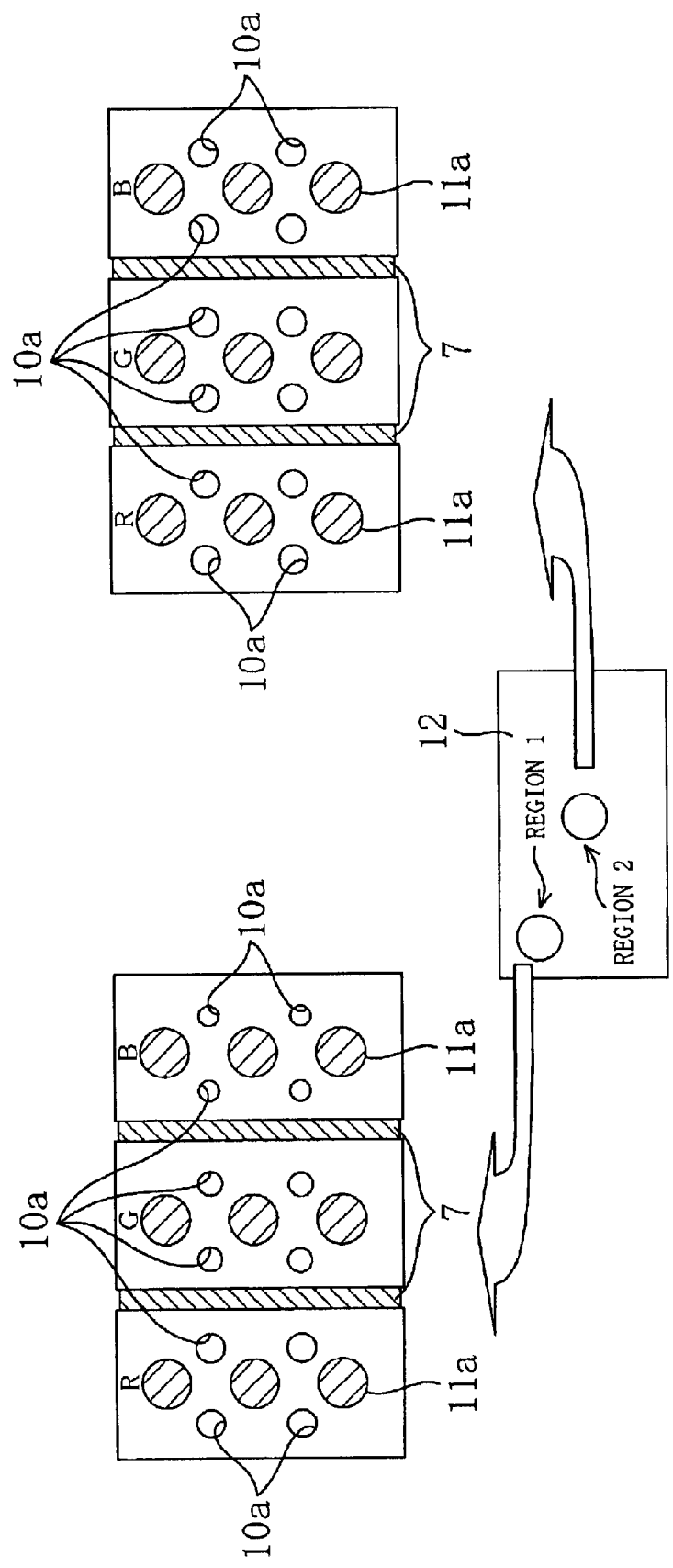
FIG. 9 is a plan view schematically illustrating one picture element obtained by the production method illustrated in Embodiment 2, while the exposure condition, etc., are adjusted so that a colorless region (opening 10a) of a colored layer 10 in the central portion of the substrate is formed with a designed size.

FIG. 9 is a plan view schematically illustrating one picture element in a case where the substrate is produced by the method illustrated in Embodiment 2 while adjusting the exposure conditions, etc., so that the colorless regions (openings 10a) of the colored layer 10 in a central portion of the substrate (Region 2) are formed with a designed size. A colorless region in an edge portion of the substrate (Region 1) tends to have a smaller dimension than that in the central portion of the substrate (Region 2), and R, G and B pixel regions tend to have successively smaller colorless regions when the production step is repeated in the order of R, G and B. This is because there is a greater decrease in the sensitivity of the resist in the edge portion of the substrate (Region 1) than in the central portion of the substrate (Region 2), thereby resulting in an inferior dimensional precision of the colorless region in the edge portion of the substrate (Region 1), and because the R, G and B colored layers have successively increasing amounts of dimensional shift as they are formed in the order of R, G and B. Moreover, it is necessary to adjust the exposure condition, etc., each time the exposure step, etc., are performed, thereby resulting in a poor productivity.

Figure 10:
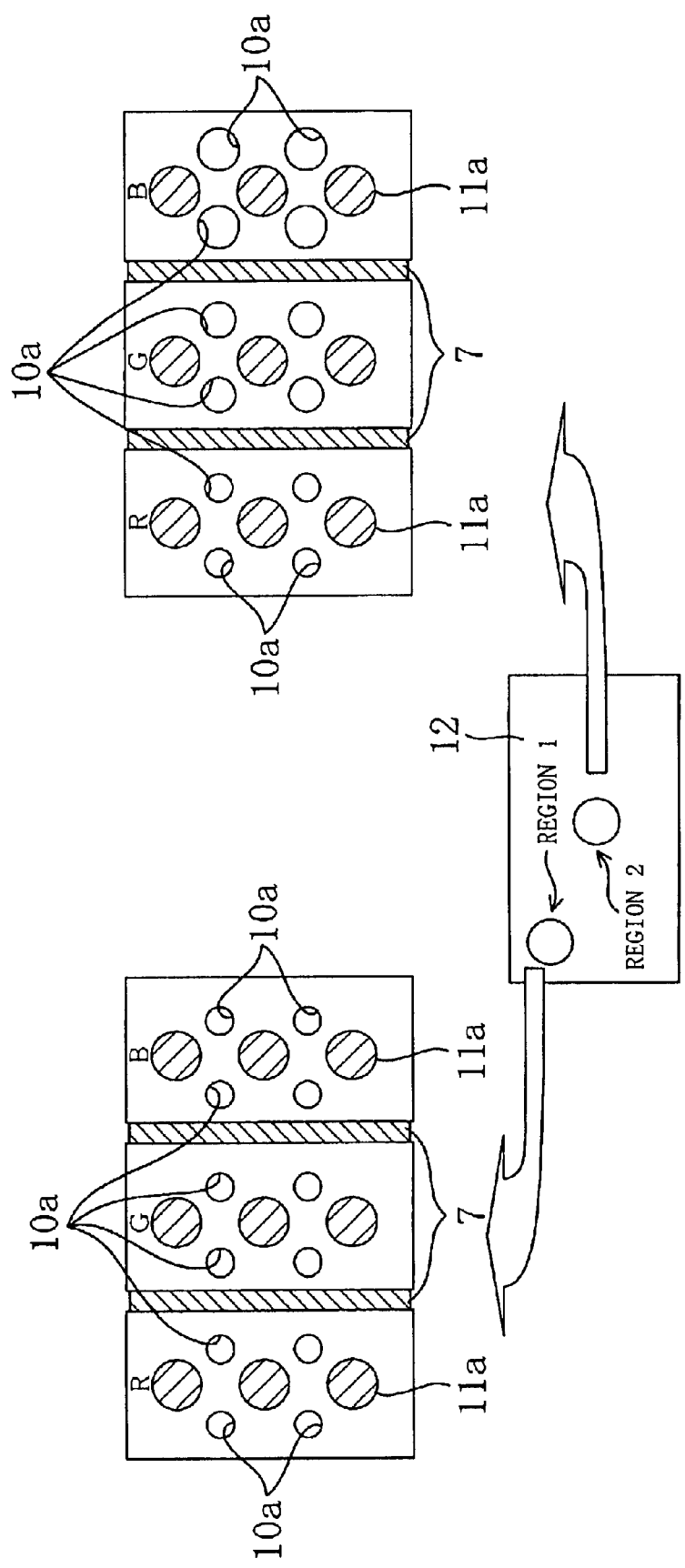
FIG. 10 is a plan view schematically illustrating one picture element obtained by the production method illustrated in Embodiment 2, while the exposure condition, etc., are adjusted so that the colorless region (opening 10a) of the colored layer 10 in the edge portion of the substrate is formed with a designed size, in the central portion of the substrate and in the edge portion of the substrate.

FIG. 10 is a plan view schematically illustrating one picture element in a case where the substrate is produced by the method illustrated in Embodiment 2 while adjusting the exposure conditions, etc., so that the colorless regions (openings 10a) of the colored layer 10 in the edge portion of the substrate (Region 1) are formed with a designed size. A colorless region in the central portion of the substrate (Region 2) tends to have a larger dimension than that in the edge portion of the substrate (Region 1), and R, G and B pixel regions tend to have successively larger colorless regions when the exposure and development step is repeated in the order of R, G and B. This is because the sensitivity of the resist is higher in the central portion of the substrate (Region 2) than in the edge portion of the substrate (Region 1), thereby resulting in an inferior dimensional precision of the colorless region in the central portion of the substrate (Region 2), and the R, G and B colored layers have successively increasing amounts of dimensional shift as they are formed in the order of R, G and B. Moreover, it is necessary to adjust the exposure condition, etc., each time the exposure step, etc., are performed, thereby resulting in a poor productivity.

Figure 11:
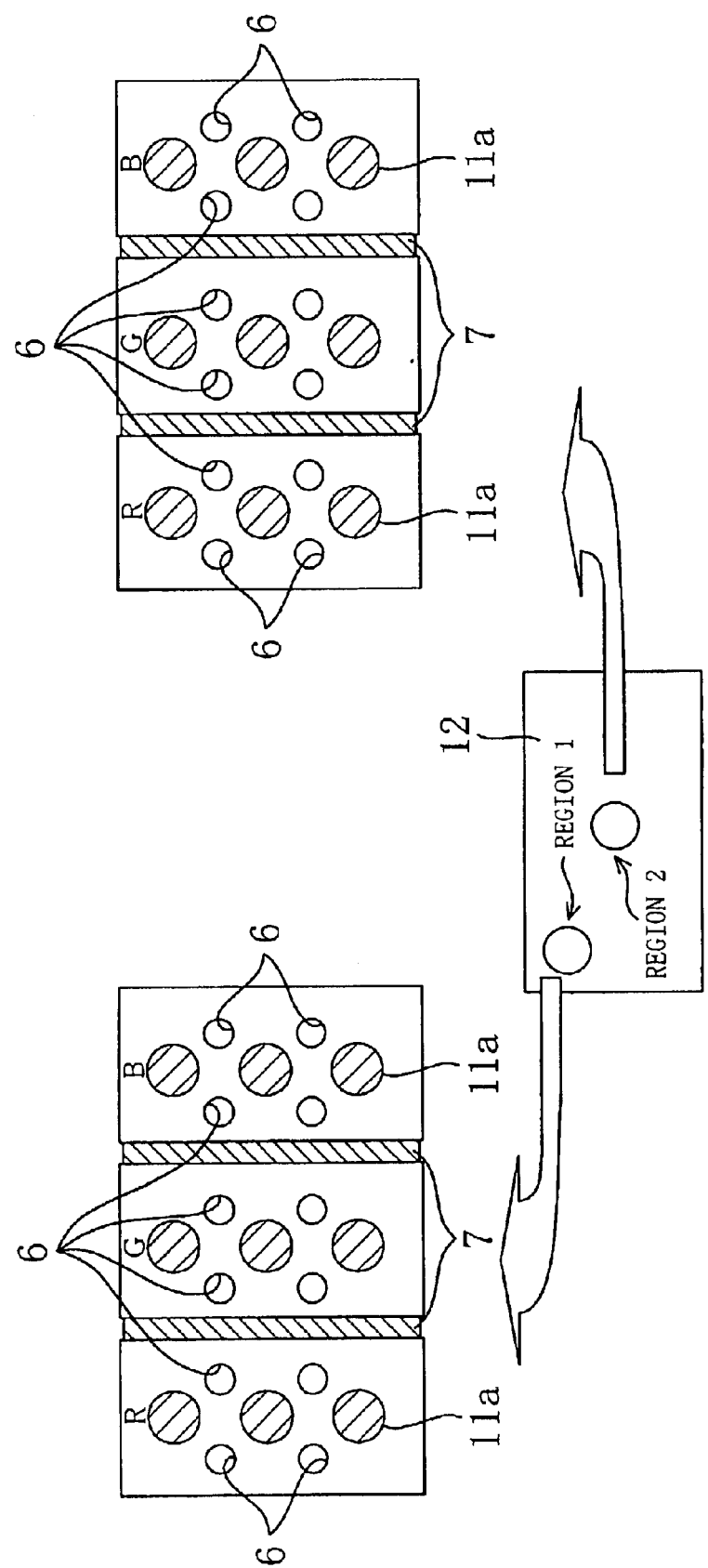
FIG. 11 is a plan view schematically illustrating one picture element in the central portion and in the edge portion of the substrate having colored layers of Embodiment 1.

FIG. 11 is a plan view schematically illustrating one picture element of Embodiment 1. Since the size of the colorless region is determined by first forming the colorless layer 6, the process is not influenced by the poor dimensional precision of the colored layers due to the decrease in the sensitivity of the resist, as in Embodiment 2, whereby dimensional variations do not occur in the substrate surface. Therefore, the total area of a plurality of colorless regions (openings 10a) included in each of the R, G and B pixel regions is the same for the same hue. Moreover, in Embodiment 1, the influence of the poor dimensional precision of the color filter due to the decrease in the sensitivity of the resist is absorbed by the light-blocking film provided along the periphery of each pixel and the linear gap between pixels, which does not contribute to the display, whereby it is not necessary to adjust the exposure condition, etc., each time the exposure step, etc., are performed, and thus the productivity does not decrease.

Next, Table 1 below shows the diameter of the colorless region (opening 10a) in each of the R, G and B pixel regions in the central portion of the substrate and that in the edge portion of the substrate in a case where the exposure condition, etc., are set so that the colorless region (opening 10a) in each of the R, G and B pixel regions in the central portion of the substrate is formed with a designed diameter, i.e., in the case of Embodiment 2 as illustrated in FIG. 9.

TABLE 1

|  | Edge portion | Central portion | Design value |
| --- | --- | --- | --- |
| Hole diameter in Red region | 19 $\mu$m | 20 $\mu$m | 20 $\mu$m |
| Hole diameter in Green region | 18 $\mu$m | 20 $\mu$m | 20 $\mu$m |
| Hole diameter in Blue region | 17 $\mu$m | 20 $\mu$m | 20 $\mu$m |

According to Table 1, the opening in each of the R, G and B pixel regions has a diameter that is smaller than the design value in the edge portion of the substrate. It can also be seen that the shift from the design value is greater for G (second color) than for R (first color), and is greater for B (third color) than for G (second color). This is because the exposure sensitivity is lower in the edge portion of the substrate than in the central portion of the substrate, and because the difference in the exposure sensitivity between the central portion of the substrate and the edge portion of the substrate increases as the sintering step is repeated for R, G and B, as described above.

Figure 12:
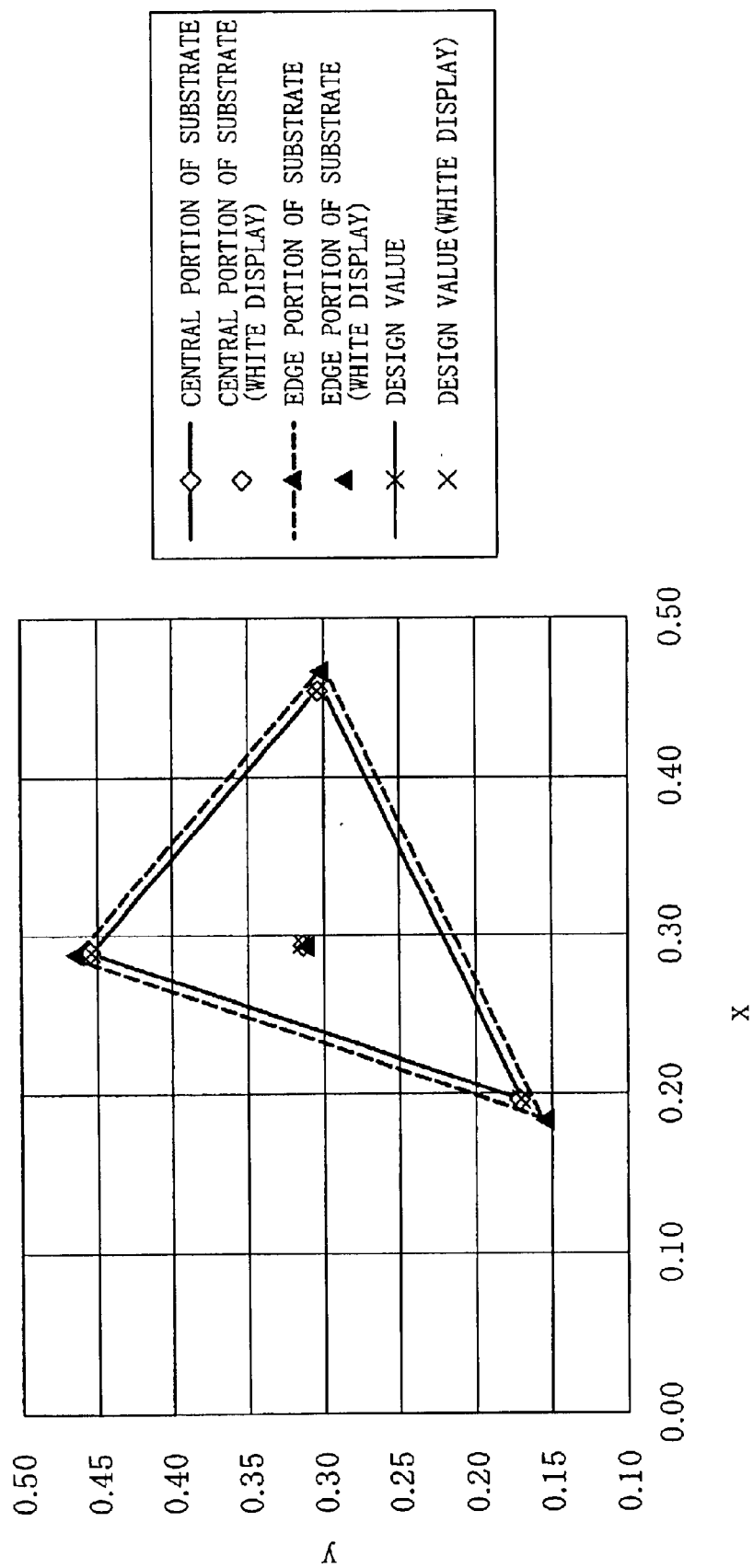
FIG. 12 is a chromaticity diagram in a reflection mode in the central portion and in the edge portion of the substrate having colored layers illustrated in FIG. 9.

The chromaticity in a reflection mode was measured with a liquid crystal display device produced by using the substrate having colored layers of Embodiment 2 as illustrated in FIG. 8 (step (j)). The chromaticity in a reflection mode is shown in Table 2 below, and the chromaticity diagram is shown in FIG. 12.

TABLE 2

|  | Central portion | | | Edge portion | | | Design value | | |
| --- | --- | --- | --- | --- | --- | --- | --- | --- | --- |
|  | Y | x | y | Y | x | y | Y | x | y |
| Red | 26.55 | 0.4542 | 0.3054 | 24.84 | 0.4672 | 0.3044 | 26.55 | 0.4542 | 0.3054 |
| Green | 64.98 | 0.2885 | 0.4549 | 63.75 | 0.2867 | 0.4660 | 64.98 | 0.2885 | 0.4549 |
| Blue | 22.66 | 0.1945 | 0.1703 | 19.06 | 0.1808 | 0.1531 | 22.66 | 0.1945 | 0.1703 |
| White | 38.06 | 0.2937 | 0.3147 | 35.89 | 0.2912 | 0.3139 | 38.06 | 0.2937 | 0.3147 |

The reason for measuring only the chromaticity in a reflection mode is because the precision of the colorless region of the colored layer has a significant influence on the display using reflected light. In a transmission display mode, light coming from the reverse side of the liquid crystal display device passes through the opening in the reflection layer and reaches the viewer through the colored layer in the transmission region. Therefore, the transmitted light does not pass through the colorless region of the colored layer and thus is not significantly influenced by the precision of the colorless region.

The chromaticity was measured by using OSP-200 manufactured by Olympus Optical Co., Ltd. (C light source 2° field of view, glass reference). The chromaticity of reflected light was measured for each of the hues, red, green and blue, for each pixel. The Y value, the x value and the y value (XYZ color system) of each of red, green and blue were obtained by measuring the reflection spectral characteristics of each of the hues, red, green and blue. The Y value, the x value and the y value for a white display were obtained based on the average value of the X value, the Y value and the Z value of each of R (red), G (green) and B (blue).

It can be seen from Table 2 and FIG. 12 that in the central portion of the substrate, the area of the colorless region (opening 10a) for each of R, G and B is as designed and a chromaticity as designed is exhibited. In the edge portion of the substrate, however, it can be seen that the chromaticity is shifted from the design value, the reflection Y value is reduced, and the color is darkened. It can also be seen that the amount of chromaticity shift is greater for G than for R, and is greater for B than for G. Since the amount of chromaticity shift varies among different hues, the chroma-ticity of a white display is also shifted from the design value in the edge portion of the substrate. Therefore, in a case where the exposure condition, etc., are set so that the design value is obtained for the colorless region (opening 10a) for each of R, G and B in the central portion of the substrate, a display as designed is obtained in the central portion of the substrate, whereas the display in a reflection mode is dark and is bluish as a whole in the edge portion of the substrate.

Next, Table 3 below shows the diameter of the colorless region (opening 10a) in each of the R, G and B pixel regions in the central portion of the substrate and that in the edge portion of the substrate in a case where the exposure condition, etc., are set so that the colorless region (opening 10a) in each of the R, G and B pixel regions in the edge portion of the substrate is formed with a designed diameter, i.e., in the case of Embodiment 2 as illustrated in FIG. 10.

TABLE 3

|  | Edge portion | Central portion | Design value |
| --- | --- | --- | --- |
| Hole diameter in Red region | 20 μm | 21 μm | 20 μm |
| Hole diameter in Green region | 20 μm | 22 μm | 20 μm |
| Hole diameter in Blue region | 20 μm | 23 μm | 20 μm |

According to Table 3, the opening in each of the R, G and B pixel regions has a diameter that is larger than the design value in the central portion of the substrate. It can also be seen that the shift from the design value is greater for G (second color) than for R (first color), and is greater for B (third color) than for G (second color). This is because the exposure sensitivity is higher in the central portion of the substrate than in the edge portion of the substrate, and because the difference in the exposure sensitivity between the central portion of the substrate and the edge portion of the substrate increases as the sintering step is repeated for R, G and B, as described above.

Figure 13:
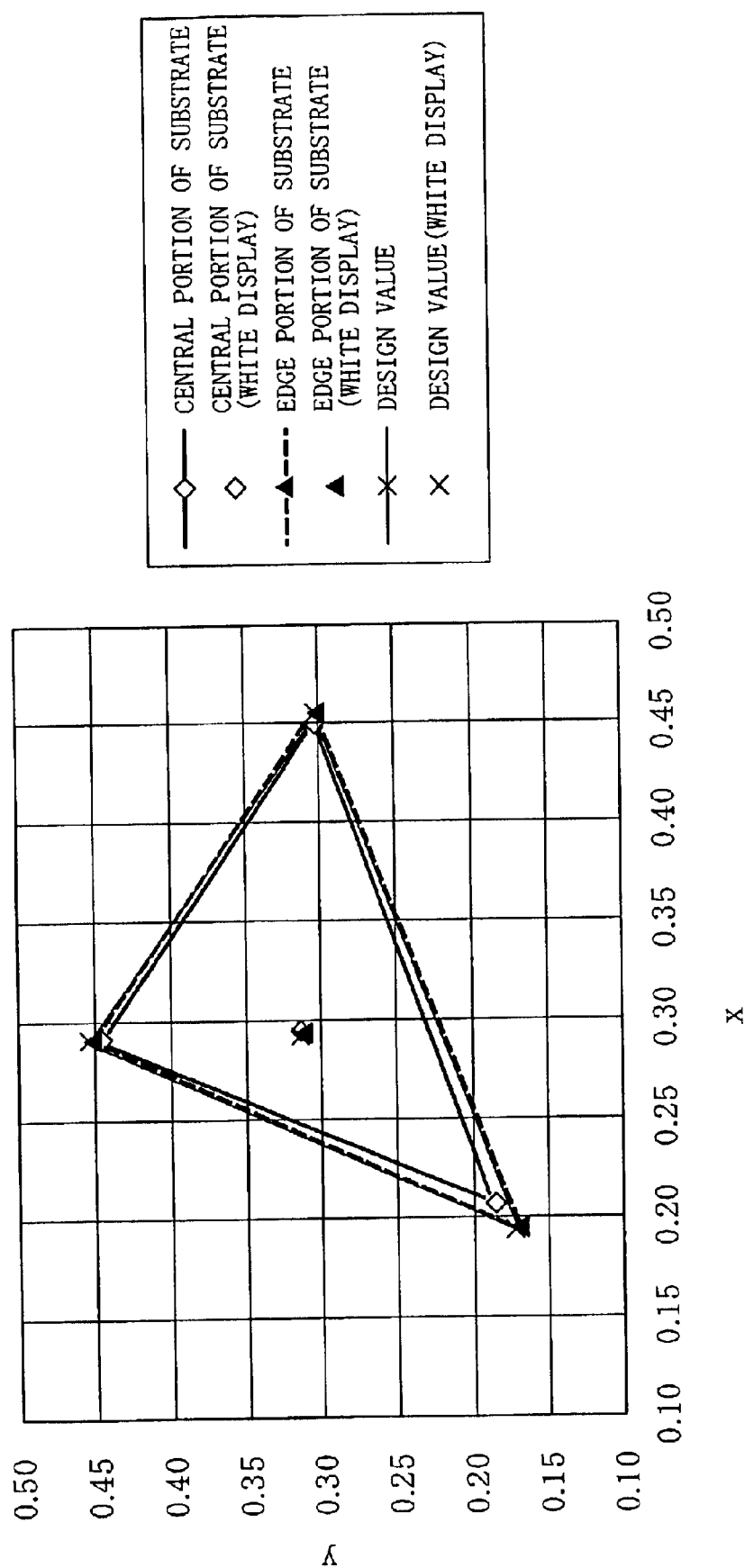
FIG. 13 is a chromaticity diagram in a reflection mode in the central portion and in the edge portion of the substrate having colored layers illustrated in FIG. 10.

The chromaticity of the substrate having colored layers in a reflection mode is shown in Table 4 below, and the chromaticity diagram is shown in FIG. 13. Note that the chromaticity measurement method, etc., are the same as those for Table 2 and FIG. 12.

TABLE 4

|  | Central portion | | | Edge portion | | | Design value | | |
| --- | --- | --- | --- | --- | --- | --- | --- | --- | --- |
|  | Y | x | y | Y | x | y | Y | x | y |
| Red | 27.41 | 0.4483 | 0.3058 | 26.55 | 0.4542 | 0.3054 | 26.55 | 0.4542 | 0.3054 |
| Green | 65.79 | 0.2896 | 0.4479 | 64.98 | 0.2885 | 0.4549 | 64.98 | 0.2885 | 0.4549 |
| Blue | 26.26 | 0.2065 | 0.1855 | 22.66 | 0.1945 | 0.1703 | 22.66 | 0.1945 | 0.1703 |
| White | 39.82 | 0.2961 | 0.3160 | 38.06 | 0.2937 | 0.3147 | 38.06 | 0.2937 | 0.3147 |

It can be seen from Table 4 and FIG. 13 that in the edge portion of the substrate, the area of the opening for each of R, G and B is as designed and a chromaticity as designed is exhibited. In the central portion of the substrate, however, it can be seen that the chromaticity is shifted from the design value, and the color is lightened. It can also be seen that the amount of chromaticity shift is greater for G than for R, and is greater for B than for G. Since the amount of chromaticity shift varies among different hues, the chromaticity of a white display is also shifted from the design value in the central portion of the substrate. Therefore, in a case where the exposure condition, etc., are set so that the design value is obtained for the colorless region (opening 10a) for each of R, G and B in the edge portion of the substrate, a display as designed is obtained in the edge portion of the substrate, whereas the color is light in a reflection mode and is yellowish as a whole in the central portion of the substrate. It can be seen from the results above that it is not possible to realize a uniform display in the substrate surface with Embodiment 2.

Next, Table 5 below shows the diameter of the colorless region (colorless layer 6) in each of the R, G and B pixel regions in the central portion of the substrate and that in the edge portion of the substrate in Embodiment 1.

TABLE 5

|  | Edge portion | Central portion | Design value |
|---|---|---|---|
| Hole diameter in Red region | 20 μm | 20 μm | 20 μm |
| Hole diameter in Green region | 20 μm | 20 μm | 20 μm |
| Hole diameter in Blue region | 20 μm | 20 μm | 20 μm |

According to Table 5, the diameter of the colorless region in each of the R, G and B pixel regions is as designed both in the central portion of the substrate and in the edge portion of the substrate. Even with a design such that colorless regions of different diameters are formed in the R, G and B pixel regions, it is possible to obtain colorless regions of the designed size in each of the R, G and B pixel regions. This is because the area of the colorless region is determined by first forming the colorless layer 6. Specifically, in Embodiment 1, the gradual change in the exposure sensitivity of the resist in the substrate surface due to the repetition of the exposure, development and sintering steps, as that occurring in Embodiment 2, does not occur, whereby it is possible to obtain colorless regions having the designed area.

Figure 14:
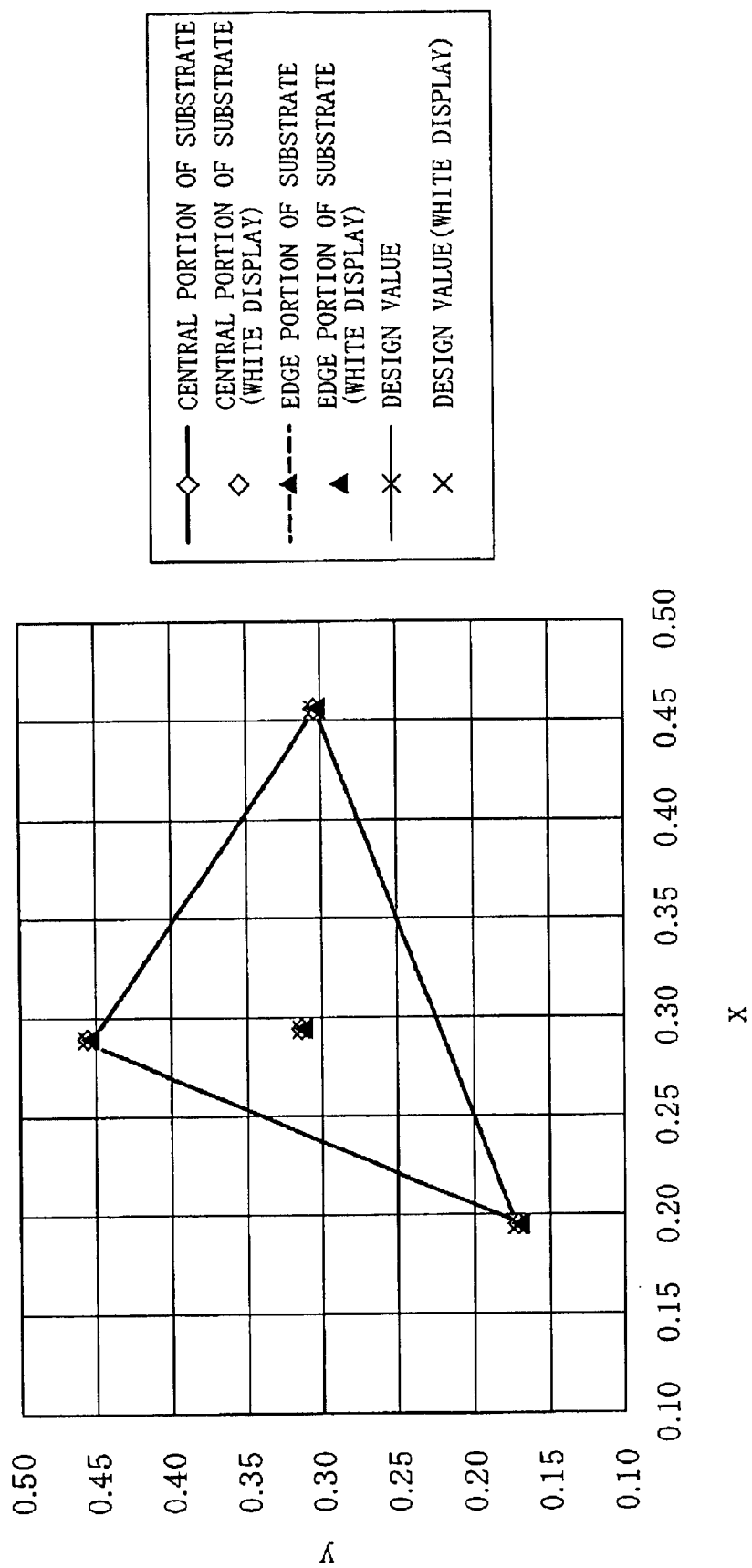
FIG. 14 is a chromaticity diagram in a reflection mode in the central portion and in the edge portion of the substrate having colored layers illustrated in Embodiment 1.

The chromaticity of the substrate having colored layers of Embodiment 1 in a reflection mode is shown in Table 6 below, and the chromaticity diagram is shown in FIG. 14. Note that the chromaticity measurement method, etc., are the same as those for Table 2 and FIG. 12.

without a shift in the display chromaticity, both in the central portion and in the edge portion of the substrate.

In Embodiment 1, the Y value for each of the hues, R, G and B, in the central portion of the substrate is the same as that in the edge portion of the substrate. In other words, the Y value in a white display in the central portion of the substrate is the same as that in the edge portion of the substrate. However, the Y value in a white display in the central portion of the substrate may not be the same as that in the edge portion of the substrate, and there may be a difference in the Y value as long as a uniform display is obtained in the substrate surface. Specifically, there may be a difference in the Y value of about 1 or less. In Embodiments 1 and 2, the chromaticity in a reflection mode is measured at two positions, i.e., one in the central portion of the substrate and another in the edge portion of the substrate. Alternatively, the chromaticity in a reflection mode may be measured at three or more positions, while calculating the average Y value (the Y value in a white display) at each position and comparing the Y values at the different positions with one another.

EMBODIMENT 3

In Embodiment 3, the substrate is a resin substrate. The substrate having colored layers of the present embodiment is not different from that of Embodiment 1 (where the substrate is made of a glass) except that the substrate is made of a resin. Therefore, the elements and the production method of the present embodiment will not be described below.

In a case where a synthetic resin (plastic) substrate is used, the substrate expands/contracts during the production process, thereby reducing the alignment precision. Therefore, it is very difficult to form a colorless region in a colored layer with a high precision. The production method of the present invention is very effective for the problem.

Specifically, in a case where a black matrix is formed after the formation of the colorless layer, as illustrated in FIG. 5, it is necessary to stringently control the temperature only in the exposure step for forming the black matrix so that the colorless layer is placed within a region partitioned by the black matrix (light-blocking layer) or within a pixel region defined by electrodes, and the exposure and the development of the R, G and B colored layers can be performed under a not so stringent temperature control. Moreover, also in a case where the colorless layer is formed after the formation of the black matrix, the R, G and B colored layers may be formed under a not so stringent temperature control because the colorless layer is formed before the formation of the colored layers, thereby defining the colorless region in the colored layer. Thus, in the present embodiment, a stringent

TABLE 6

|  | Central portion | | | Edge portion | | | Design value | | |
|---|---|---|---|---|---|---|---|---|---|
|  | Y | x | y | Y | x | y | Y | x | y |
| Red | 26.55 | 0.4542 | 0.3054 | 26.55 | 0.4542 | 0.3054 | 26.55 | 0.4542 | 0.3054 |
| Green | 64.98 | 0.2885 | 0.4549 | 64.98 | 0.2885 | 0.4549 | 64.98 | 0.2885 | 0.4549 |
| Blue | 22.66 | 0.1945 | 0.1703 | 22.66 | 0.1945 | 0.1703 | 22.66 | 0.1945 | 0.1703 |
| White | 38.06 | 0.2937 | 0.3147 | 38.06 | 0.2937 | 0.3147 | 38.06 | 0.2937 | 0.3147 |

As can be seen from Table 6 and FIG. 14, the size of the colorless region in each of the R, G and B pixel regions is as designed, and thus a chromaticity as designed is exhibited both in the central portion of the substrate and in the edge portion of the substrate. Therefore, in Embodiment 1, it is possible to obtain a uniform display in the substrate surface, temperature control is not required for the formation of the R, G and B colored layers, thereby increasing the margin of the conditions for the exposure step for the hues, R, G and B, thus obtaining a chromaticity as that of Embodiment 1.

In a case where a synthetic resin substrate is used, the substrate is likely to expand/contract during the production process. Therefore, it is difficult to form a colorless region in a colored layer with a high precision not only with a successive exposure/development type photoresist as described above, but also with a production method, such as the pigment dispersion method, in which colored layers are formed successively. In other words, when a synthetic resin substrate is used, the alignment precision is lower than when a glass substrate is used, because the synthetic resin substrate expands/contracts due to the thermal influence during the formation of the colored layers and the influence of the film stress of the colored layers. The influence of heat on a synthetic resin substrate will now be described in greater detail with a substrate having colored layers of a comparison example that is obtained by using a synthetic resin substrate and using the conventional production method.

With a synthetic resin substrate, the substrate expands/contracts due to the temperature during the exposure step, thereby causing an alignment shift. In a case where a colorless region (opening) is not provided in the colored layer, it is only necessary to ensure that the colored layer is placed within a pixel region. Therefore, the substrate can be produced by setting an appropriate atmosphere temperature. Specifically, it is only necessary to control the temperature of the substrate in an about ±0.3° C. range, and any more stringent temperature control is not necessary.

Figure 15:
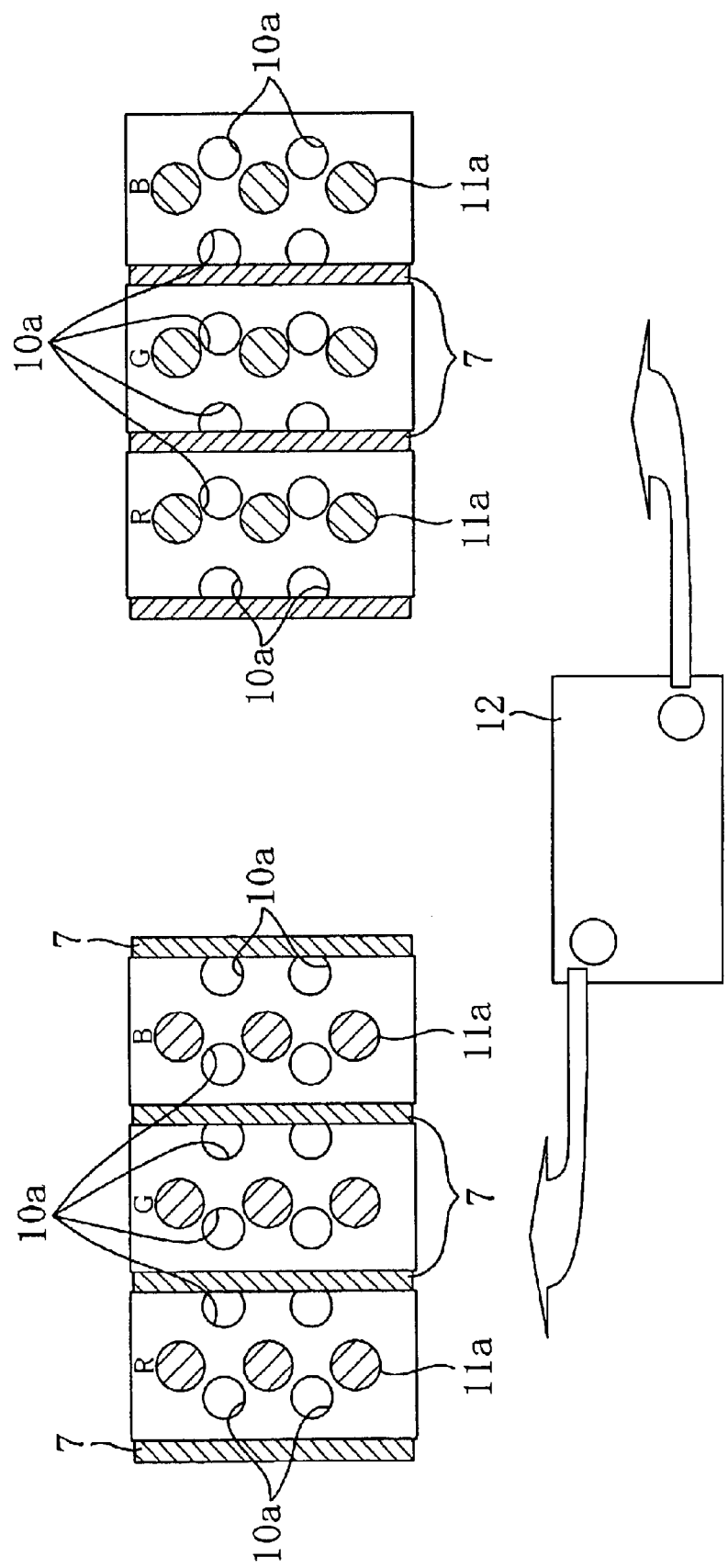
FIG. 15 is a plan view schematically illustrating one picture element in the edge portion of the substrate in a case where the substrate has expanded in a comparative example.

However, in a case where a colorless region (opening) is provided in the colored layer, it is necessary to ensure that the opening in the colored layer does not overlap with an opening in the black matrix or the reflection layer, thereby requiring a more stringent substrate temperature control. In order to make the substrate temperature control more stringent, it is necessary not only to stringently control the atmosphere temperature of the factory and the temperature of the exposure device, but also to control the temperature of the substrate, which is put into the exposure device. For example, when the residence time as a whole from the step of forming the light-blocking film to the formation of the colored layers is short, the residence time is shorter than the predetermined tact time, whereby the substrate is exposed with the substrate temperature being higher than the predetermined temperature. Then, in the edge portion of the substrate, the colorless regions (openings 10a) are formed at positions that are inner (closer to the center of the substrate) than the designed positions, whereby the openings overlap with the black matrix 7, as illustrated in FIG. 15.

Figure 16:
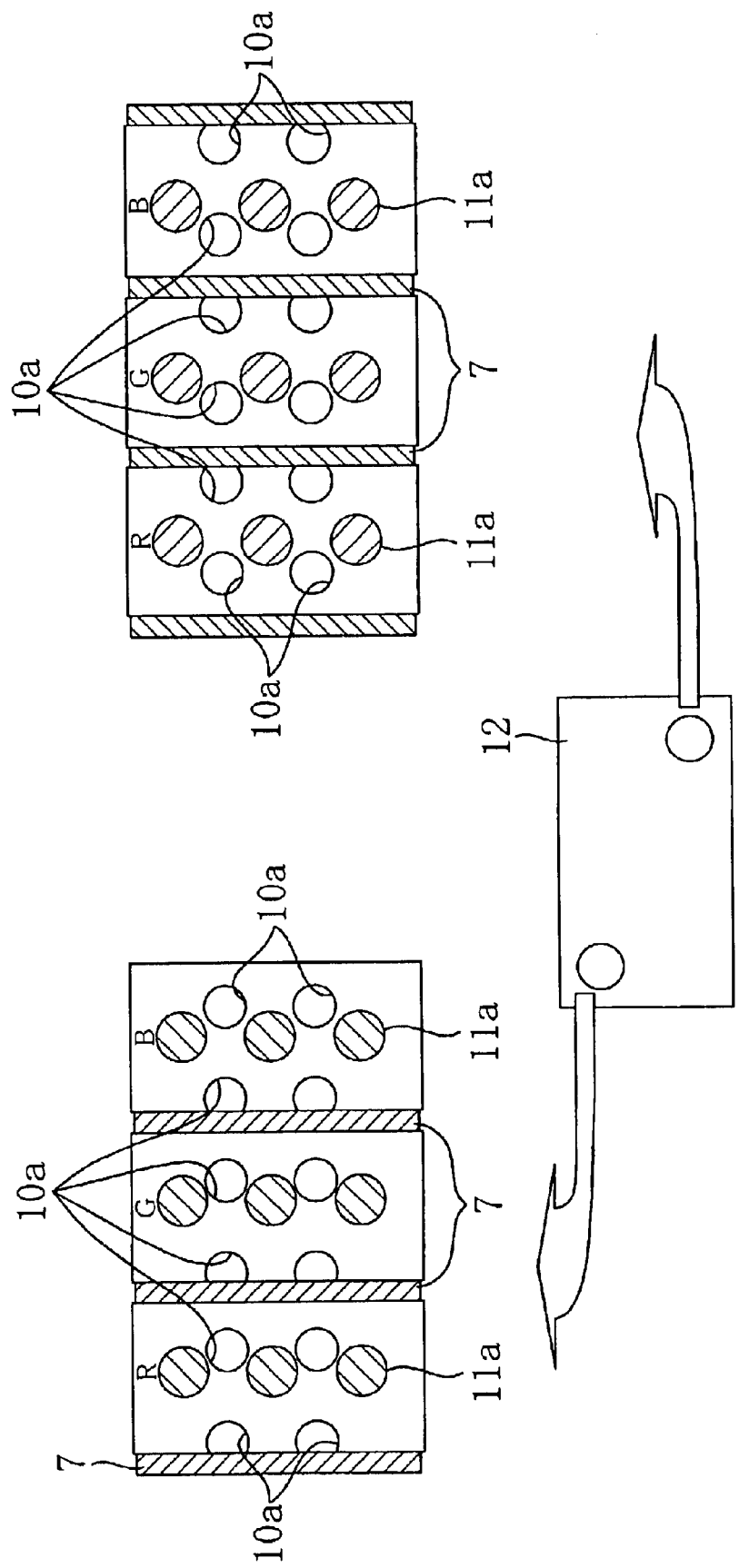
FIG. 16 is a plan view schematically illustrating one picture element in the edge portion of the substrate in a case where the substrate has contracted in a comparative example.

Conversely, when the residence time is long, or when the cooling is excessive, the temperature during the exposure step for R, G and B is lower than the temperature during the exposure step for forming the light-blocking film, whereby in the edge portion of the substrate, the colorless regions (openings 10a) are formed at positions that are outer (closer to the edge of the substrate) than the designed positions, whereby the openings overlap with the black matrix 7, as illustrated in FIG. 16. As described above, when the colorless regions (openings 10a) are provided in the colored layers, a stringent temperature control is required, thereby lowering the productivity.

Figure 17A:
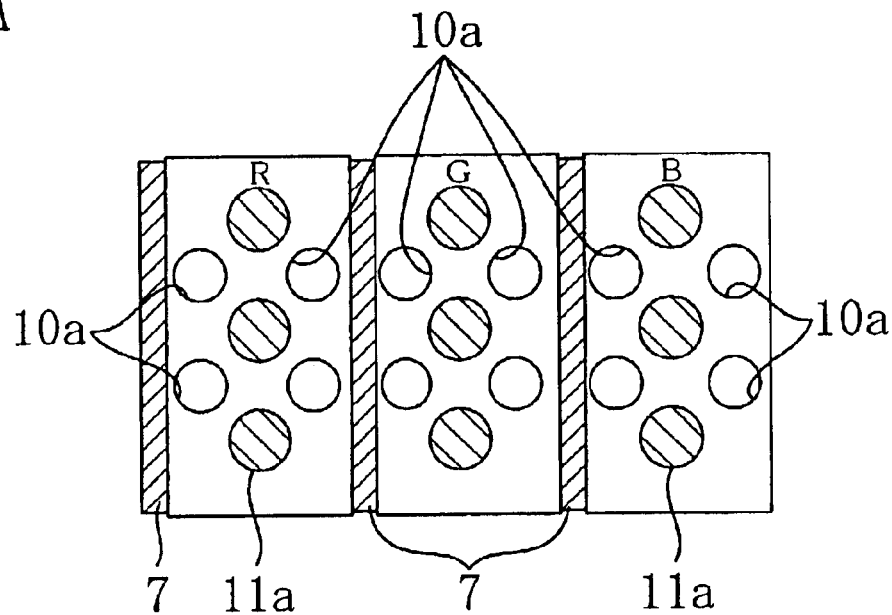
FIG. 17A is a schematic plan view illustrating one picture element in the central portion of the substrate in a case where conditions are set so that a proper alignment is ensured in the central portion of the substrate.
Figure 17B:
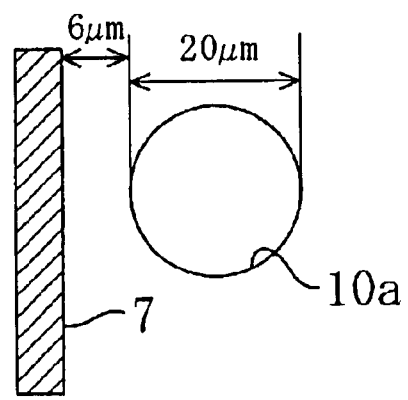
FIG. 17B is a plan view illustrating the positional relationship between a colorless region 10a and a black matrix 7.
Figure 18A:
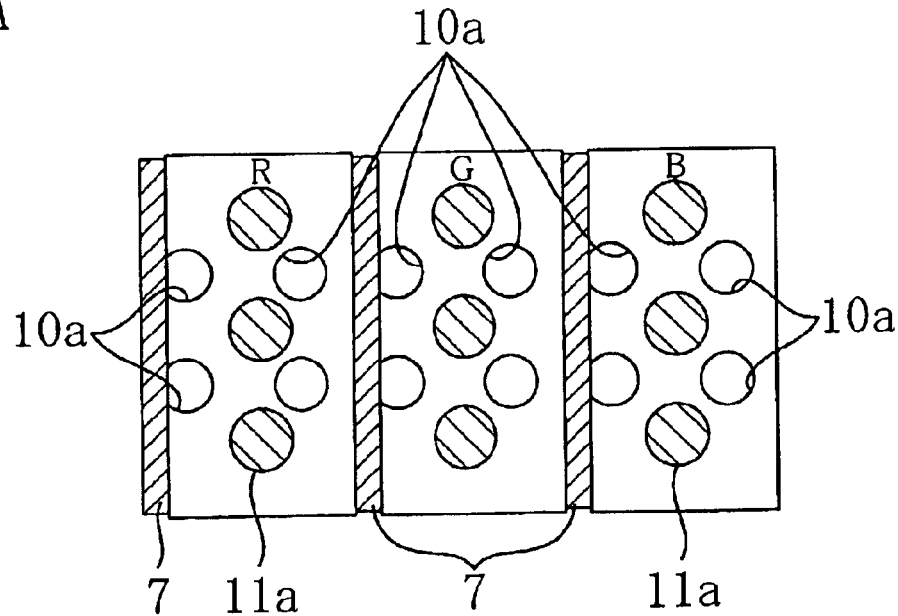
FIG. 18A is a schematic plan view illustrating one picture element in the edge portion of the substrate in a case where conditions are set so that a proper alignment is ensured in the central portion of the substrate.
Figure 18B:
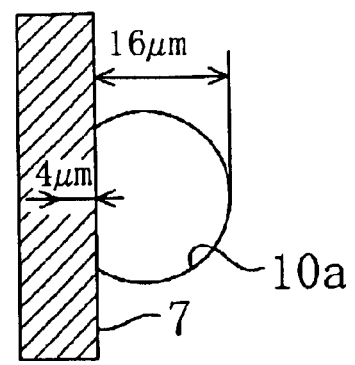
FIG. 18B is a plan view illustrating the positional relationship between the colorless region 10a and the black matrix 7.

FIG. 17A and FIG. 17B are schematic plan views each illustrating one picture element in the central portion of the substrate, and FIG. 18A and FIG. 18B are schematic plan views each illustrating one picture element in the edge portion of the substrate, in a case where the conditions are set so as to ensure a proper alignment in the central portion of the substrate. In the central portion of the substrate, a proper alignment is ensured, and the opening 10a of the colored layer 10 is formed within a pixel region, as illustrated in FIG. 17A and FIG. 17B. However, in the edge portion of the substrate, the opening 10a of the colored layer 10 overlaps with the black matrix 7, thereby reducing the area of the opening 10a, as illustrated in FIG. 18A and FIG. 18B. This is because the substrate expands/contracts, resulting in the overlap, due to the variations in the temperature during the exposure step when forming the R, G and B colored layers 10.

The chromaticity in a case where an alignment shift of 10 μm occurs, as illustrated in FIG. 18B, is shown in Table 7 below, and the chromaticity diagram is shown in FIG. 19.

TABLE 7

|  | Central portion | | | Edge portion | | | Design value | | |
| --- | --- | --- | --- | --- | --- | --- | --- | --- | --- |
|  | Y | x | y | Y | x | y | Y | x | y |
| Red | 26.55 | 0.4542 | 0.3054 | 23.14 | 0.4820 | 0.3033 | 26.55 | 0.4542 | 0.3054 |
| Green | 64.98 | 0.2885 | 0.4549 | 63.35 | 0.2861 | 0.4700 | 64.98 | 0.2885 | 0.4549 |
| Blue | 22.66 | 0.1945 | 0.1703 | 19.06 | 0.1808 | 0.1531 | 22.66 | 0.1945 | 0.1703 |
| White | 38.06 | 0.2937 | 0.3147 | 35.18 | 0.2916 | 0.3145 | 38.06 | 0.2937 | 0.3147 |

Figure 20:
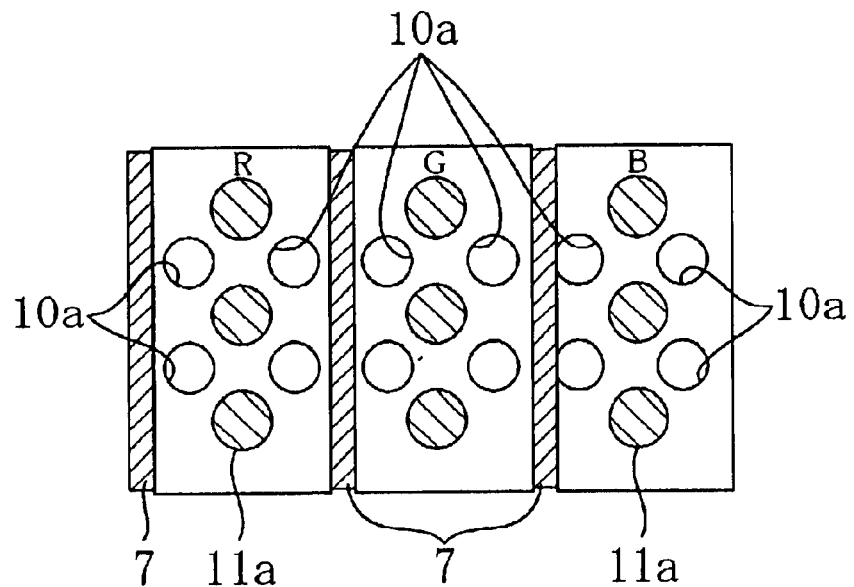
FIG. 20 is a schematic plan view illustrating one picture element in a case where the opening 10a has shifted only in a blue colored layer 10.

As illustrated in FIG. 19, it can be seen that a chromaticity as designed is exhibited in the central portion of the substrate. In the edge portion of the substrate, however, the area of the opening 10a is reduced, whereby the Y value is reduced. Therefore, when a liquid crystal display device is produced by using the substrate having colored layers, a display as designed is obtained in the central portion of the substrate, whereas in the edge portion of the substrate, the display in a reflection mode is dark, though an overall chromaticity change is not observed. Note that while FIG. 18 shows a case where the opening 10a is shifted in all of the R, G and B colored layers 10, the opening 10a may possibly be shifted only for B, as illustrated in FIG. 20, or only for R or G. Also in such a case, the chromaticity is shifted between the central portion and the edge portion of the substrate, as illustrated in FIG. 19.

Figure 21:
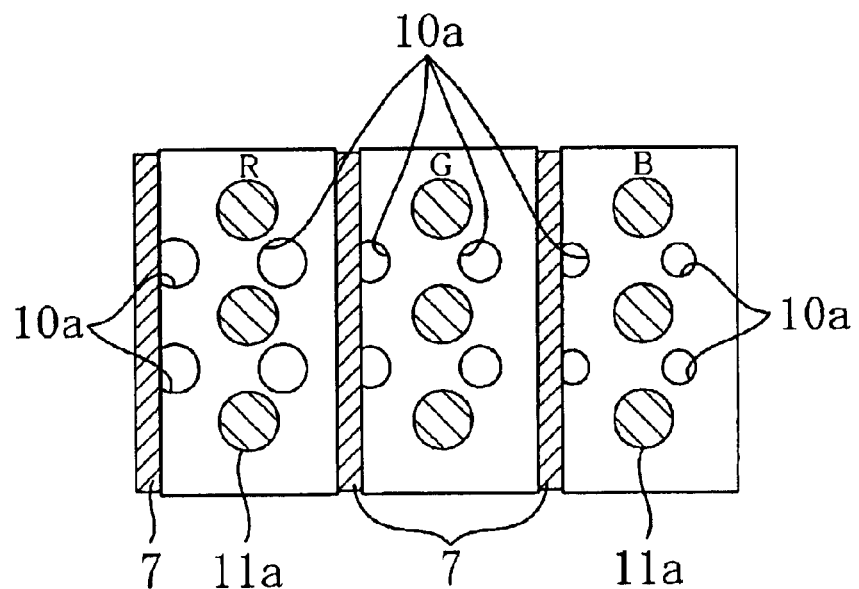
FIG. 21 is a schematic plan view illustrating one picture element in the edge portion of the substrate in a case where the colored layer 10 is formed on a synthetic resin substrate by using a resist direct electrodeposition method.

Next, a case where the colored layer 10 is formed on a synthetic resin substrate by using a resist direct electrodeposition method will be described. FIG. 17A is a schematic plan view illustrating one picture element in the central portion of the substrate, and FIG. 21 is a schematic plan view illustrating one picture element in the edge portion of the substrate, in a case where the conditions are adjusted so that the design value is obtained in the central portion of the substrate and a proper alignment is ensured in the central portion of the substrate.

Figure 22:
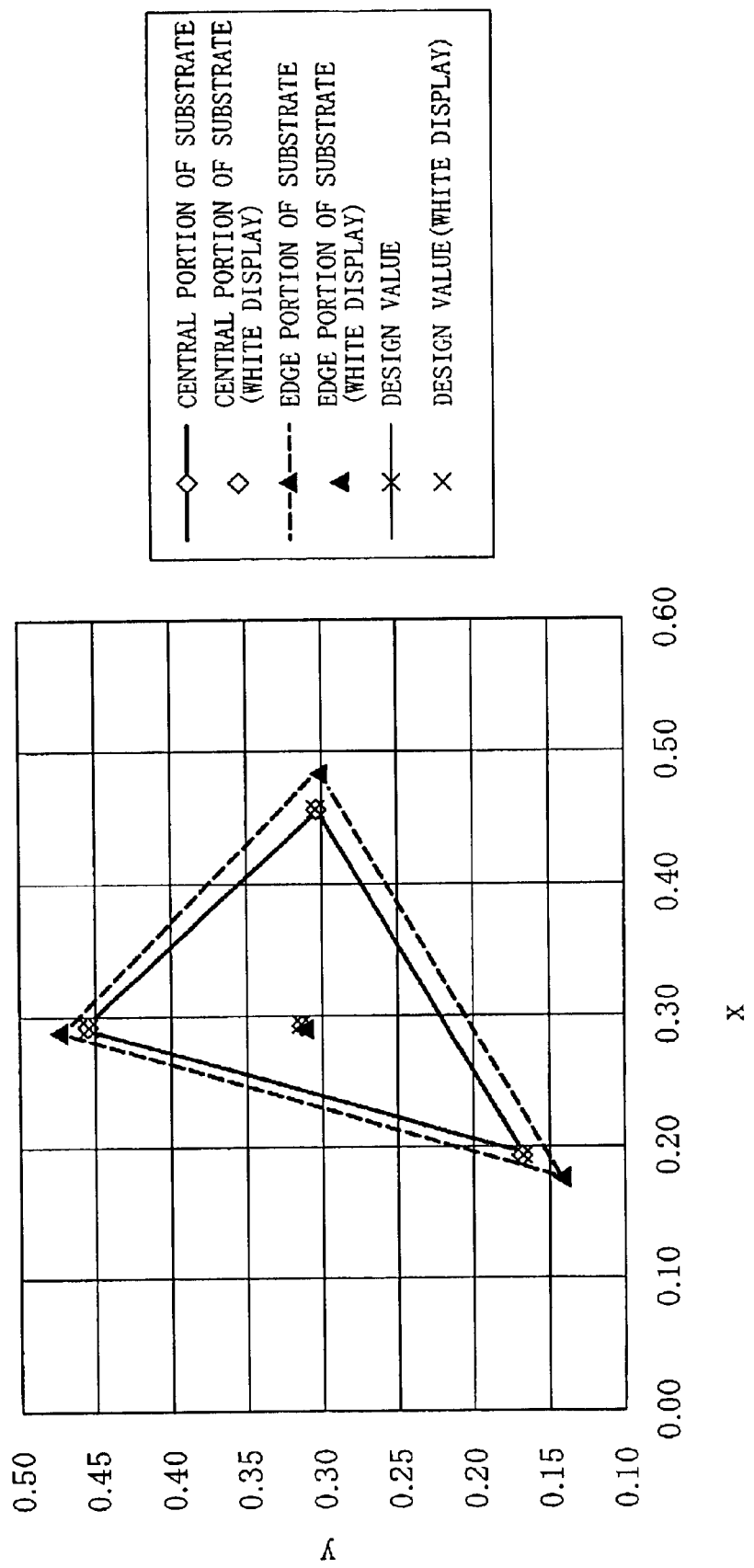
FIG. 22 is a chromaticity diagram in a reflection mode in the central portion of the substrate and in the edge portion of the substrate in a case where the colored layer 10 is formed on a synthetic resin substrate by using a resist direct electrodeposition method.

In the central portion of the substrate, a proper alignment is ensured, and the openings 10a of the colored layer 10 are placed within the pixel region. Moreover, each opening 10a is formed with a designed size. In the edge portion of the substrate, however, an alignment shift occurs, whereby the opening 10a overlaps with the black matrix 7. Moreover, as in Embodiment 2, the size of the opening 10a is smaller than the design value for all of the colored layers 10. It can also be seen that the shift from the design value gradually increases as the colored layers 10 are formed in the order of R, G and B, as in Embodiment 2. The chromaticity is shown in Table 8 below, and the chromaticity diagram is shown in FIG. 22.

TABLE 8

|  | Central portion | | | Edge portion | | | Design value | | |
| --- | --- | --- | --- | --- | --- | --- | --- | --- | --- |
|  | Y | x | y | Y | x | y | Y | x | y |
| Red | 26.55 | 0.4542 | 0.3054 | 23.14 | 0.4820 | 0.3033 | 26.55 | 0.4542 | 0.3054 |
| Green | 64.98 | 0.2885 | 0.4549 | 62.94 | 0.2855 | 0.4741 | 64.98 | 0.2885 | 0.4549 |
| Blue | 22.66 | 0.1945 | 0.1703 | 17.27 | 0.1732 | 0.1436 | 22.66 | 0.1945 | 0.1703 |
| White | 38.06 | 0.2937 | 0.3147 | 34.45 | 0.2900 | 0.3138 | 38.06 | 0.2937 | 0.3147 |

In the central portion of the substrate, an alignment shift does not occur, and each opening 10a is formed with a designed area, whereby a chromaticity as designed is exhibited. In the edge portion of the substrate, however, an alignment shift occurs, and each opening 10a is formed with a smaller size. Thus, it can be seen that the Y value is reduced, and the chromaticity is shifted from the design value while darkening the color. It can also be seen that the amount of chromaticity shift is greater for G than for R, and is greater for B than for G. Furthermore, the amount of chromaticity shift is greater than that in Embodiment 2 (see FIG. 12), and the chromaticity shift in the substrate surface is greater in a case where a synthetic resin substrate is used. Therefore, when a liquid crystal display device is produced by using the substrate having colored layers, a display as designed is obtained in the central portion of the substrate, whereas the display in a reflection mode is dark and is bluish as a whole in the edge portion of the substrate. Moreover, the amount of variation is greater in a case where a synthetic resin substrate is used. Note that due to the shift in the size or position of the opening 10a, the region of the opening 10a may overlap with the region of the opening 11a of the reflector 11. In such a case, a chromaticity shift in the substrate surface may possibly occur not only in a reflection display mode but also in the transmission display mode.

Figure 23:
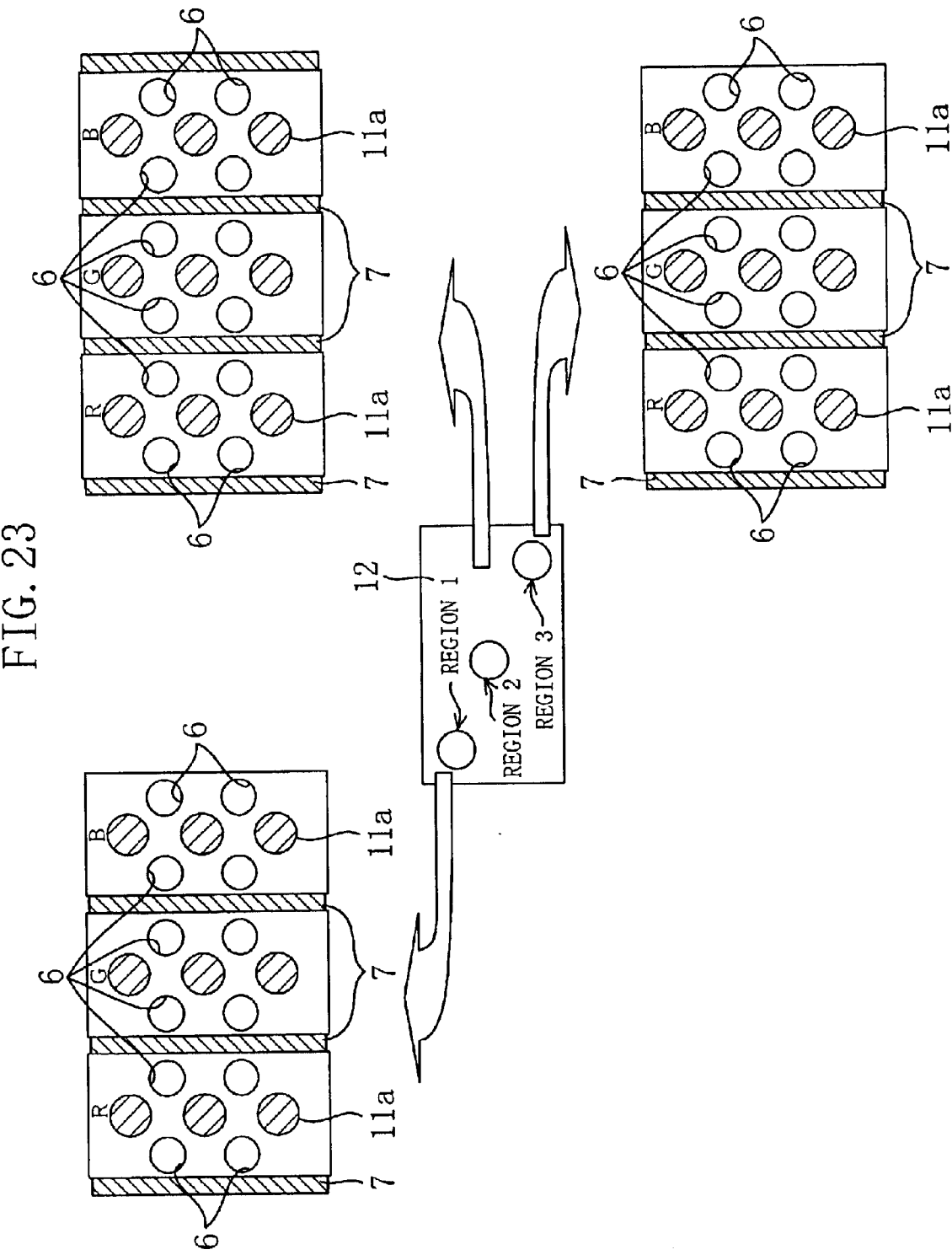
FIG. 23 is a plan view schematically illustrating one picture element in the central portion and in the edge portion of a substrate having colored layers of Embodiment 3.
Figure 24A:
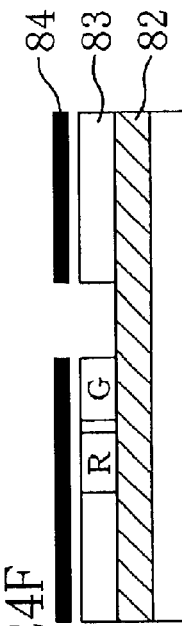
FIG. 24A to FIG. 24J are schematic cross-sectional views illustrating the steps for forming a color filter by using a resist direct electrodeposition method.
Figure 24B:
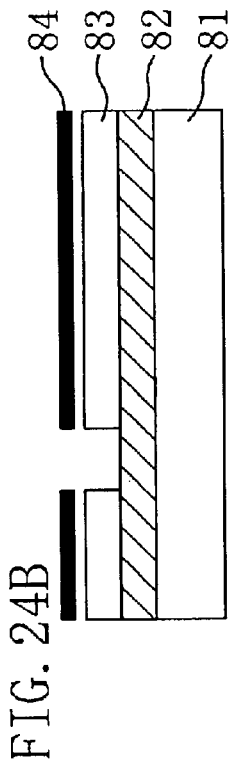
Figure 24C:
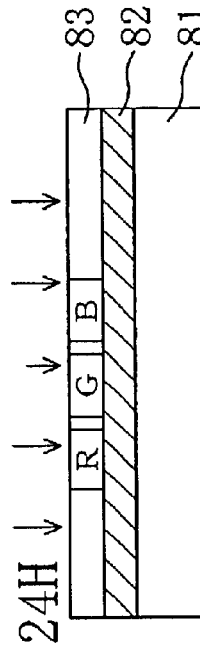
Figure 24D:
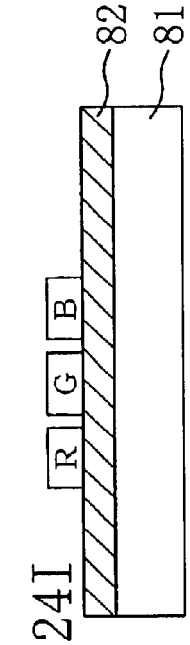
Figure 24E:
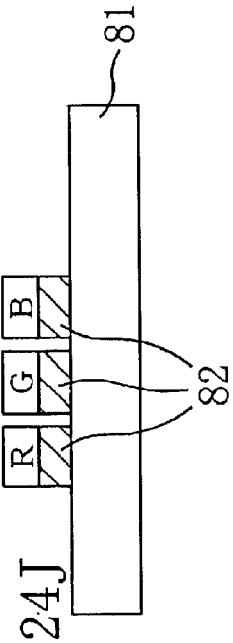
Figure 24F:
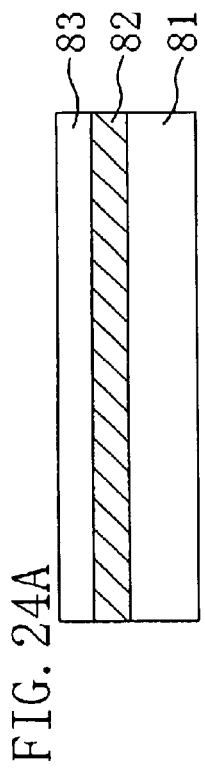
Figure 24G:
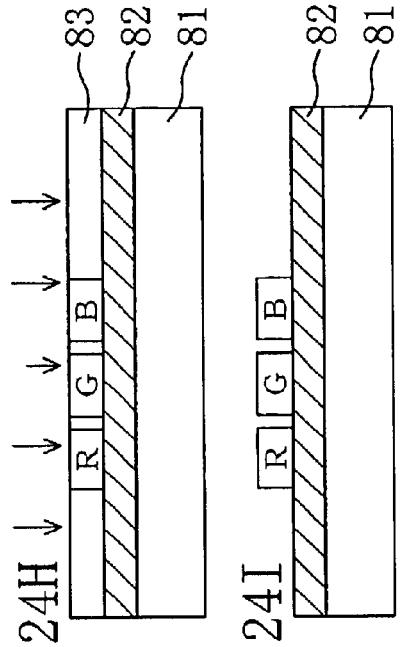
Figure 24H:
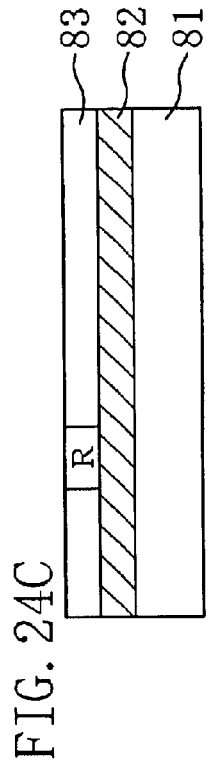
Figure 24I:
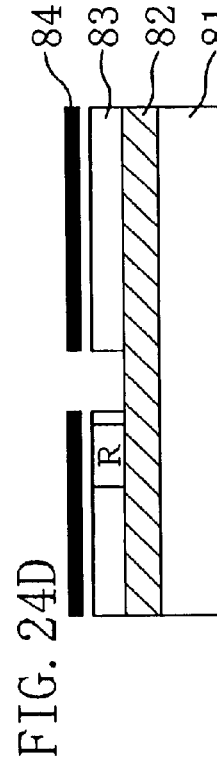
Figure 24J:
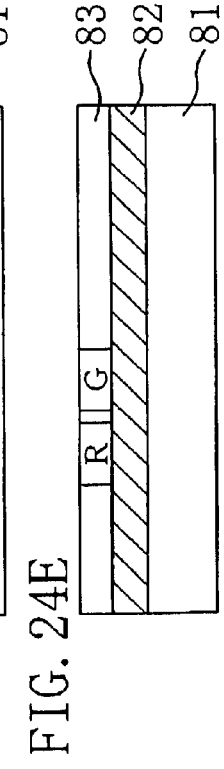

According to Embodiment 3, even in a case where the colored layer 10 is formed on the synthetic resin substrate 12 by using a resist direct electrodeposition method, the colorless layer 6 can be formed with the designed value within the colorless region both in the central portion of the substrate and in the edge portion of the substrate, as illustrated in FIG. 23. Therefore, there is no display chromaticity shift between the central portion and the edge portion of the substrate, and a uniform display can be realized in the substrate surface.

EMBODIMENT 4

In Embodiment 4, the colorless layer, which defines the colorless region of the colored layer, is made of a transparent resin material that is of the same type as a pigment-dispersed color filter material but that does not contain a pigment. In the present embodiment, the colorless layer can be formed in the colorless region during the step of forming the colored layer. The elements of the liquid crystal display device of the present embodiment are the same as those the liquid crystal display device of Embodiment 1. Therefore, the elements of the liquid crystal display device of the present embodiment will not be described below.

A method for producing a substrate having colored layers of Embodiment 4 will now be described. First, an ITO film, on which colored layers are to be electrodeposited, is formed across the entire surface of the glass substrate 12 having the reflection film 11 including the openings 11a therein. The successive exposure/development type photoresist 16, which can be used repeatedly, is applied across the entire surface. A portion of the photoresist 16 in the colorless region is removed through an exposure and development process. An electrodeposition color filter material in which a pigment is not dispersed is electrodeposited in a region where the electrodeposition ITO film is exposed (colorless region), thereby forming a no-pigment colored layer (equivalent to the colorless layer 6). The no-pigment colored layer (colorless layer) is made of a colorless and transparent resin. The colorless and transparent resin may be a polyester/melamine resin-based anionic electrodeposition resin that is used as an electrodeposition color filter material, for example. Similarly, a portion of the photoresist 16 in a region where the black matrix (Bk), which is a light-blocking film, is to be electrodeposited is removed through an exposure and development process so that the electrode is exposed, and the light-blocking film is electrodeposited in the region.

Next, an area of the photoresist 16 that is slightly larger than a pixel region that is to be colored in red so as to remove a portion of the photoresist 16 corresponding to the red pixel region. The red colored layer 10R is formed by a resist direct electrodeposition method. In the process of electrodepositing the red colored layer 10R, the no-pigment colored layer (equivalent to the colorless layer 6) is already provided in each colorless region, whereby the colored layer is not formed in these regions. Therefore, it is possible to form the colorless layers 6 in the pixel region of each hue without being influenced by the production precision of the colored layer 10.

Furthermore, the colored layers 10G and 10B of the hues, green (G) and blue (B), are successively electrodeposited in a similar manner, thereby obtaining the colored layers 10R, 10G and 10B of the present embodiment. Furthermore, the overcoat film (flattening film) 9 is formed on the colored layers 10R, 10G and 10B and the no-pigment colored layer (equivalent to the colorless layer 6).

In the present embodiment, the no-pigment colored layer (equivalent to the colorless layer 6) is formed in the step before forming the R, G and B colored layers, for example. Therefore, it is possible to obtain a substrate having colored layers with uniform colorless regions without being influenced by the variations in the position or size of the colorless regions occurring as the colored layers are produced, as in the conventional production method. Moreover, in the present embodiment, the no-pigment colored layer can be formed during the step of forming the colored layer, and the colorless regions in the colored layer 10 are defined by the first exposure and development process, whereby dimensional variations of the colorless regions do not occur.

Note that while the no-pigment colored layer (equivalent to the colorless layer 6) is used in the present embodiment, a pigment for tint adjustment may be dispersed in a transparent resin, and it is still possible to ensure a high luminance for light passing through the colorless regions and to obtain effects as those of the substrate having colored layers of the present embodiment. Moreover, while a light-blocking film is formed in the present embodiment, the light-blocking film may alternatively be omitted.

EMBODIMENT 5

In the present embodiment, the refractive index of the colorless layer 6 in the substrate having colored layers obtained in Embodiment 1 was examined. The refractive index of the overcoat film (flattening film) 9 in the substrate having colored layers of Embodiment 1 is 1.5. In view of this, a chromaticity of reflected light was measured for two different transparent resins (one having a refractive index of 1.5, and another having a refractive index of 1.7) being used as the colorless layer 6. Note that the measurement method is as shown in Embodiment 1. The results are shown in Table 9 below.

TABLE 9

|  | Refractive index: n = 1.7 | | | Refractive index: n = 1.5 | | |
| --- | --- | --- | --- | --- | --- | --- |
|  | Y | x | y | Y | x | y |
| White | 36.04 | 0.293 | 0.315 | 37.34 | 0.293 | 0.315 |
| Red | 24.40 | 0.460 | 0.305 | 25.70 | 0.460 | 0.305 |
| Green | 63.27 | 0.288 | 0.458 | 64.57 | 0.288 | 0.458 |
| Blue | 20.46 | 0.191 | 0.166 | 21.76 | 0.191 | 0.166 |

It can be seen from Table 9 that the Y value varies and the chromaticity values (x, y) do not vary depending on the refractive index. Specifically, the reflectance is improved by matching the refractive index of the colorless layer 6 with that of the overcoat film (flattening film) 9, and the Y value is improved by about 3% in the present embodiment. Therefore, it is preferred that the refractive index of the colorless layer 6 is matched with that of the overcoat film (flattening film) 9. While the colorless layer 6 and the overcoat film (flattening film) 9 have the same refractive index in the present embodiment, the refractive indices thereof do not have to be equal to each other, but may be different from each other by about 0.1 or less. The refractive indices of the colorless layer 6 and the overcoat film (flattening film) 9 may be measured by using, for example, DHA-OLX/S4 manufactured by Mizojiri Optical Co., Ltd. Note that the colored layer 10 and the overcoat film (flattening film) 9 are typically made of the same type of material, whereby the refractive indices thereof are substantially the same.

ALTERNATIVE EMBODIMENTS

In Embodiments 1 to 5, the forward diffusion plate 3 is used. Alternatively, a substrate having a concave/convex pattern or a substrate on which a resin layer having a concave/convex pattern is provided may be used instead of the forward diffusion plate 3 so as to obtain a light scattering effect in a reflection mode. In Embodiments 1 to 5, the colored layer 10 is formed on the lower substrate 12, which is on the side away from the viewer. Alternatively, the colored layer 10 may be formed on the upper substrate 4, which is on the side closer to the viewer, while forming the reflection layer 11 on the lower substrate 12. Moreover, in Embodiments 1 to 5, the reflection layer 11 is formed on one side of the lower substrate 12 that is closer to the liquid crystal layer 8. Alternatively, the reflection layer 11 may be formed on the reverse side (the side closer to the backlight 14) of the lower substrate 12. Furthermore, in Embodiments 1 to 5, the present invention has been described with respect to a liquid crystal display device including polarizers. Alternatively, the present invention can be applied to a liquid crystal display device that does not require polarizers such as a guest-host liquid crystal display device or a polymer dispersed liquid crystal display device.

In Embodiments 1 to 5, the present invention has been described with respect to a case where a full color image is displayed by using the three colors of red, green and blue. Alternatively, a full color image may be displayed by using the three colors of magenta, yellow and cyan. Moreover, the liquid crystal display device of the present invention may employ any type of pixel arrangement, such as a mosaic arrangement, or a lattice arrangement.

In Embodiments 1 to 5, the colorless layer 6 is not colored. Alternatively, the colorless layer 6 may be slightly colored for tint adjustment. For example, by slightly coloring the colorless layer 6 of the liquid crystal display device of Embodiments 1 to 5 for tint adjustment, it is possible to adjust only the tint in a reflection display mode, and to delicately adjust the tint in a reflection display mode and that in a transmission display mode. Moreover, the colorless layer 6 may be formed by using a transparent resin in which a light scattering material is dispersed so as to provide the colorless layer 6 with a light diffusing function.

EMBODIMENT 6

Irrespective of the driving mode, i.e., whether the active driving mode or the passive driving mode, a liquid crystal display device including a substrate having colored layers (e.g., a semi-transmissive color liquid crystal display device) of the present invention may be used as a display of any of various electronic devices. At present, products equipped with such a display device include a portable telephone, a personal digital assistant (PDA), a personal computer (display), a notebook personal computer, a digital camera, a digital timepiece, a head-mount display, a car navigation (monitor), a projection television, a liquid crystal television, etc.

Some of the electronic devices are shown in FIG. 25A to FIG. 25E. FIG. 25A shows a front view and a back view of a foldable portable telephone being unfolded. A portable telephone (main body) 1000 includes an antenna 1001, a voice output section 1002, a main display section 1003, an operation switch 1005, and a voice input section 1006. The main body 1000 further includes a sub-display section 1004 on the back of the main body 1000. The liquid crystal display device of the present invention can be used as the main display section 1003, the sub-display section 1004, etc.

FIG. 25B is a perspective view illustrating a PDA. A PDA (main body) 2000 includes a display section 2001, an operation switch 2002, and an external connection terminal 2003. The liquid crystal display device of the present invention can be used as the display section 2001.

FIG. 25C is a perspective view illustrating a notebook personal computer. A personal computer (main body) 3000 includes a display section 3001, a keyboard 3002, and an external connection terminal 3003. The liquid crystal display device of the present invention can be used as the display section 3001.

FIG. 25D is a perspective view illustrating a liquid crystal television. A liquid crystal television (main body) 4000 includes a display section 4001, a receiver section 4002, and an operation switch 4003. The liquid crystal display device of the present invention can be used as the display section 4001.

FIG. 25E is a perspective view illustrating a video camera. A video camera (main body) 5000 includes a display section 5001, an image-receiving section 5002, an operation switch 5003, and a viewfinder 5004. The liquid crystal display device of the present invention can be used as the display section 5001.

As described above, the liquid crystal display device of the present invention has a very wide variety of applications, and can be used in an electronic device of any field. Particularly, the liquid crystal display device of the present invention is highly suitable for portable electronic devices illustrated in FIG. 25A to FIG. 25E, as it is capable of displaying a high-quality color image both in a reflection mode and in a transmission mode. Moreover, other applications include a bulletin board system, a facsimile machine, and a display of a home electronics terminal.

With a substrate having colored layers of the present invention, it is possible to obtain a display device, e.g., a liquid crystal display device, having reduced variations in the display chromaticity of reflected light and a good visibility. With a method for producing a substrate having colored layers of the present invention, it is possible to reduce the positional shift of colorless regions as the colorless regions can be formed independently of the precision with which the colored layers are formed. Therefore, it is possible to obtain a substrate having colored layers with reduced variations in the display chromaticity among pixels of the same hue.

While the present invention has been described in preferred embodiments, it will be apparent to those skilled in the art that the disclosed invention may be modified in numerous ways and may assume many embodiments other than those specifically set out and described above. Accordingly, it is intended by the appended claims to cover all modifications of the invention that fall within the true spirit and scope of the invention.

What is claimed is:

1. A substrate having colored layers for use in a display, comprising:
    a substrate;
    a reflection layer supported by at least the substrate; and
    colored layers of different colors formed on the reflection layer and including a plurality of pixel regions, so that the colored layers and the reflection layer are on a common side of a display medium of the display,
    wherein each of the plurality of pixel regions includes a plurality of colorless regions that are substantially colorless.

2. The substrate having colored layers of claim 1, wherein a total area of the plurality of colorless regions included in each of the plurality of pixel regions is the same among the colored layers of the same hue.

3. The substrate having colored layers of claim 1, wherein:
    a colorless layer that is substantially colorless is formed in each of the colorless regions of the colored layers of different colors; and
    the colored layers of different colors are formed after the formation of the colorless layers.

4. The substrate having colored layers of claim 3, wherein a flattening film for flattening the colorless layers and the colored layers is formed on the colorless layers and the colored layers, with a refractive index of the colorless layers being substantially the same as that of the flattening film.

5. The substrate having colored layers of claim 1, wherein the colored layers of different colors are red, blue and green colored layers, and as a chromaticity in a reflection mode is measured for each of the hues of the colored layers at a plurality of positions on the substrate, an average value of Y values that are taken for each hue is substantially the same among the plurality of positions on the substrate.

6. The substrate having colored layers of claim 1, wherein each of the plurality of pixel regions includes a transmission region in which light is transmitted and a reflection region in which light is reflected by the reflection layer, with the plurality of colorless regions being included in the reflection region.

7. The substrate having colored layers of claim 1, wherein the substrate is a resin substrate.

8. A liquid crystal display device including the substrate having colored layers of claim 1.

9. An electronic device including the liquid crystal display device of claim 8.

10. The substrate of claim 1, wherein the display medium comprises liquid crystal material.

11. The substrate of claim 1, wherein a plurality of apertures are defined in the reflection layer.

12. The substrate of claim 11, wherein the apertures in the reflection layer are not aligned with the plurality of colorless regions that are substantially colorless.

13. A method for producing a substrate having colored layers, including a substrate and colored layers of different colors formed on the substrate, the colored layers including a plurality of colorless regions that are substantially colorless, the method comprising:
    forming at least one colorless layer that is substantially colorless on the substrate; and
    forming the colored layers of different colors, one hue after another, in a region other than the colorless regions in which the at least one colorless layer has been formed.

14. The method for producing a substrate having colored layers of claim 13, comprising the steps of:
    forming a resist film on the substrate;
    exposing and developing the resist film so as to remove a portion of the resist film in each of the colorless regions, and then forming the at least one colorless layer in the colorless regions; and
    after the formation of the at least one colorless layer, exposing and developing the resist film so as to remove a portion of the resist film in each region where the colored layer is to be formed, and then forming the colored layer.

15. The method for producing a substrate having colored layers of claim 13, wherein the colorless layer is made of the same type of material as a material of the colored layer excluding a pigment.

16. The method for producing a substrate having colored layers of claim 13, comprising the steps of:
    forming a photosensitive resin film that is substantially colorless on the substrate;
    removing a portion of the resin film in a region other than the colorless regions, and forming the at least one colorless layer in the colorless regions; and
    forming the colored layers of different colors, one hue after another, in a region other than the regions in which the at least one colorless layer has been formed.

17. The method for producing a substrate having colored layers of claim 13, comprising the steps of:
    after the formation of the colorless layers, forming a resist film on the substrate;
    exposing and developing the resist film so as to remove a portion of the resist film in a region where the colored layer of one of the different colors is to be formed, and then forming the colored layer of the one of the different colors; and after the formation of the colored layer of the one of the different colors, exposing and developing the resist film so as to remove a portion of the resist film in a region where the colored layer of another one of the different colors is to be formed, and forming the colored layer of the other one of the different colors.

18. The method for producing a substrate having colored layers of claim 13, wherein the at least one colorless layer and/or the colored layers are formed by electrodeposition.

19. A liquid crystal display device including a substrate having colored layers produced by the method of claim 18, wherein a reflection layer is formed on the substrate, the reflection layer including an opening portion that transmits light therethrough and a reflection portion that reflects light, with each of the colorless regions being formed in the reflection portion.

20. The method for producing a substrate having colored layers of claim 13, wherein the substrate is a resin substrate.

21. A liquid crystal display device including a substrate having colored layers produced by the method of claim 20, wherein a reflection layer is formed on the substrate, the reflection layer including an opening portion that transmits light therethrough and a reflection portion that reflects light, with each of the colorless regions being formed in the reflection portion.

22. The method of claim 13, further comprising forming a reflective electrode and forming apertures in the reflective electrode, and wherein the apertures in the reflective electrode are not aligned with a plurality of colorless regions that are substantially colorless.

* * * * *

UNITED STATES PATENT AND TRADEMARK OFFICE
CERTIFICATE OF CORRECTION

PATENT NO. : 6,824,935 B2
DATED : November 30, 2004
INVENTOR(S) : Tanaka et al.

It is certified that error appears in the above-identified patent and that said Letters Patent is hereby corrected as shown below:

Title page,
Item [56], References Cited, U.S. PATENT DOCUMENTS, add -- US 2002/0021388 --.

Signed and Sealed this

Tenth Day of May, 2005

JON W. DUDAS
*Director of the United States Patent and Trademark Office*